United States Patent [19]

Kurahashi et al.

[11] 4,285,006
[45] Aug. 18, 1981

[54] GHOST CANCELLATION CIRCUIT SYSTEM

[75] Inventors: Koichiro Kurahashi; Yoshiro Nakajima; Yoshiki Mizutani, all of Amagasaki, Japan

[73] Assignee: Mitsubishi Denki Kabushiki Kaisha, Amagasaki, Japan

[21] Appl. No.: 61,021

[22] Filed: Jul. 26, 1979

Related U.S. Application Data

[63] Continuation-in-part of Ser. No. 903,737, May 8, 1978, abandoned.

[30] Foreign Application Priority Data

Jul. 22, 1977 [JP] Japan ................................ 52-88633
Feb. 8, 1978 [JP] Japan ................................ 53-13951
Feb. 8, 1978 [JP] Japan ................................ 53-13952

[51] Int. Cl.³ .............................................. H04N 5/21
[52] U.S. Cl. ............................................ 358/35; 358/37; 358/166; 358/905
[58] Field of Search ............... 358/35, 37, 166, 167, 358/905; 455/276, 283, 278, 304

[56] References Cited

U.S. PATENT DOCUMENTS

| 3,988,775 | 10/1976 | Nakagawa | 325/476 |
| 4,006,421 | 2/1977 | Mermoz | 325/476 X |
| 4,047,224 | 9/1977 | Yamaguti | 358/905 X |
| 4,081,837 | 3/1978 | Tada et al. | 358/905 X |
| 4,128,848 | 12/1978 | Nakagawa | 358/905 X |

OTHER PUBLICATIONS

IEEE Journal of Solid-State Circuits, Aug. 1975, pp. 247-249.
IEEE Transactions on Consumer Electronics, vol. CE-23, No. 3, Aug. 1977, pp. 327-334.

Primary Examiner—Robert L. Richardson
Attorney, Agent, or Firm—Oblon, Fisher, Spivak, McClelland & Maier

[57] ABSTRACT

A ghost cancellation circuit system comprises an amplifier for forming an output signal of a composite wave of a direct wave and a ghost wave; a carrier wave extracting circuit for extracting the carrier wave having the reference phase from the output signals of the amplifier; phase shifting means for generating a detection axis signal having the specific phase of the output of the carrier wave extracting circuit; a pair of phase detection circuits for a phase detection of the output of the amplifier by the detection axis signal of the phase shifting means or the carrier wave extracting circuit, and a delay circuit for forming the output in delay for a time substantially equal to the delay time of the ghost wave by receiving the output of the pair of phase detection circuits through a pair of coefficient circuits, whereby at least a specific component of the ghost wave is cancelled by summing the output of the delay circuit to the output of the phase detection circuit.

9 Claims, 15 Drawing Figures

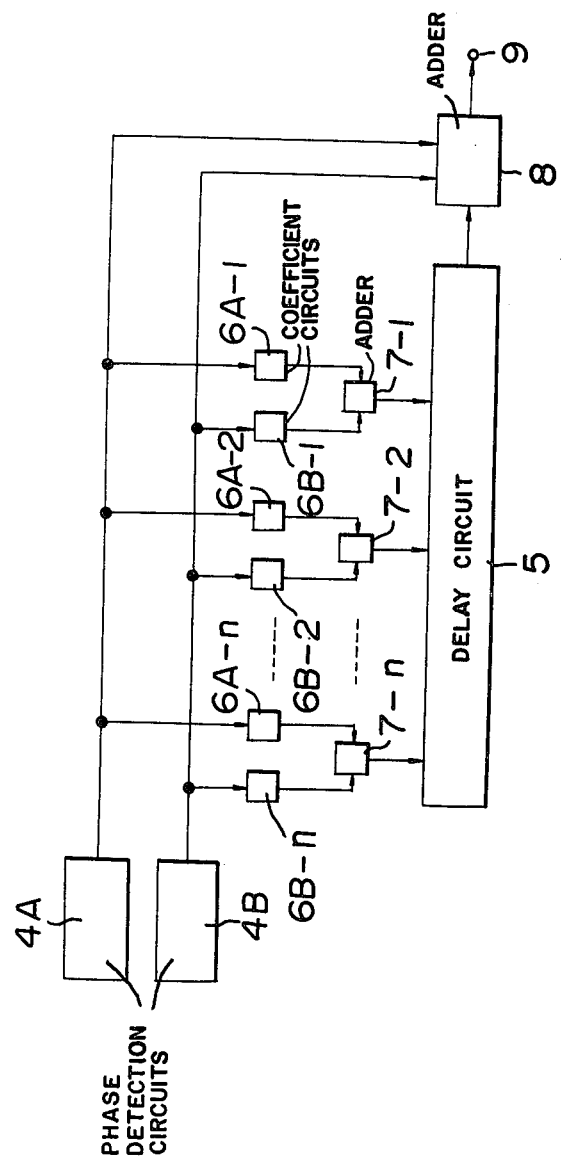
F I G. 3

GHOST CANCELLATION CIRCUIT SYSTEM

CROSS-REFERENCE TO RELATED APPLICATIONS

This application is a continuation-in-part of U.S. Application Ser. No. 903,737 filed May 8, 1978, now abandoned.

BACKGROUND OF THE INVENTION

The present invention relates to apparatus for reducing the interference caused by ghosting of TV images in TV receivers.

Ghosting results from the delay in the reflected wave or defracted wave caused by geographical features such as mountains and buildings during propagation of the broadcast wave. This manifests itself as a time delay in the propagation of the modulated signal of the ghost wave with respect to that of the direct wave (the desired broadcast wave). This delay causes a phase difference between the ghost wave and the direct wave at the receiver. Because the TV signal is a VSB (vestigial side-band modulation) signal and causes waveform distortion when the signal having different carrier phase from the phase of the carrier of the direct wave is detected (demodulated), the ghost cannot be cancelled by delaying the detected direct signal only.

In conventional one method (IEEE Trans., Vol. CE-23 No. 3, August 1977); of cancelling a ghost having a different phase, video detection is performed by two phase detector circuits and the first detector phase is adjusted to the phase of the carrier of the direct wave and the second detector phase is adjusted to the phase which reverses to the phase of the carrier of the ghost. In this system, it is necessary to control beforehand the phase of a second detector depending upon the phase of a particular ghost wave. Accordingly, since the second detected phase cannot be detected when two or more ghosts are formed, it is impossible to cancel a plurality of ghost waves. In this method, and also other conventional ghost cancelling methods, it is necessary to set-up the circuit conditions manually to give the no ghost condition (cancelled condition), that depends on the phase, amplitude ratio and delay time of each ghost. Here, these parameters (phase, amplitude ratio and delay time) are different for each ghost and vary between receiving channels. Moreover, the phase of the ghost varies in time. In order to effectively cancel the ghosts, it is necessary to easily follow the variation of the phase of ghost. When a plurality of ghosts are found, it is necessary to set the condition for cancelling the ghosts regardless of the phase of ghosts. In the automatic operation, it is important to be able to follow variation of the phase of ghosts.

SUMMARY OF THE INVENTION

An object of the present invention is to provide ghost reduction apparatus which overcomes the above disadvantages and can cancel a plurality of ghost waves having different phases.

According to one aspect of the invention there is provided a ghost cancellation circuit system which comprises a carrier extracting circuit for extracting the carrier having the reference phase from the output signal of a video-intermediate frequency amplifier (VIF amplifier); phase shifting means for generating a detection axis signal having the specific phase of the output of the carrier extracting circuit; a pair of phase detecting circuits for a phase detection of the output of the VIF amplifier by the detection axis signal of the phase shifting means or the carrier extracting circuit; and a delay circuit for forming the output in delay for the time substantially equal to the delay time of the ghost wave by receiving the output of the pair of phase detection circuits through the pair of coefficient circuits; whereby at least a specific component of the ghost wave is cancelled by summing the output of the delay circuit to the output of the phase detection circuit.

In one embodiment, a pair of phase shifting circuits are provided and the detection axis signal having phase lead of $\beta$ to that of the reference carrier is generated by the first phase shifting circuit and the detection axis signal having phase lag of $\beta$ is generated by the second phase shifting circuit, and a pair of phase detection circuits are provided to perform the phase detection of the output of VIF amplifier by the detection axis signal of the phase.

Lag circuit to generate the carrier having $\pi/2$ phase lag, and the signal of the $\pi/2$ phase lag circuit and the signal of the carrier extracting circuit are respectively used as detection axis signals in the pair of phase detection circuits to carry out the phase detection of the output of said VIF amplifier.

The outputs of the pair of phase detection circuits are summed through a pair of coefficient circuits to give the sum to the delay circuit, for generating the cancellation signal, whose delay time is adjusted substantially equal to the delay time of the ghost wave. The output of the delay circuit is summed to the outputs of the pair of phase detection circuits by an adder.

When the coefficients of the pair of coefficient circuits is set to the specific value, the ghost is cancelled at the output of the adder.

In the other embodiment of the present invention, the means for automatic setting of the coefficients of the coefficient circuits is connected.

BRIEF DESCRIPTION OF THE DRAWINGS

In order that the invention may be better understood, several embodiments thereof will now be described by way of example only and with reference to the accompanying Figures of the drawing in which:

FIGS. 3 to 15 are respectively block diagrams of different embodiments of ghost cancellation apparatus according to the present invention.

DETAILED DESCRIPTION OF THE PREFERRED EMBODIMENTS

Figure 1:
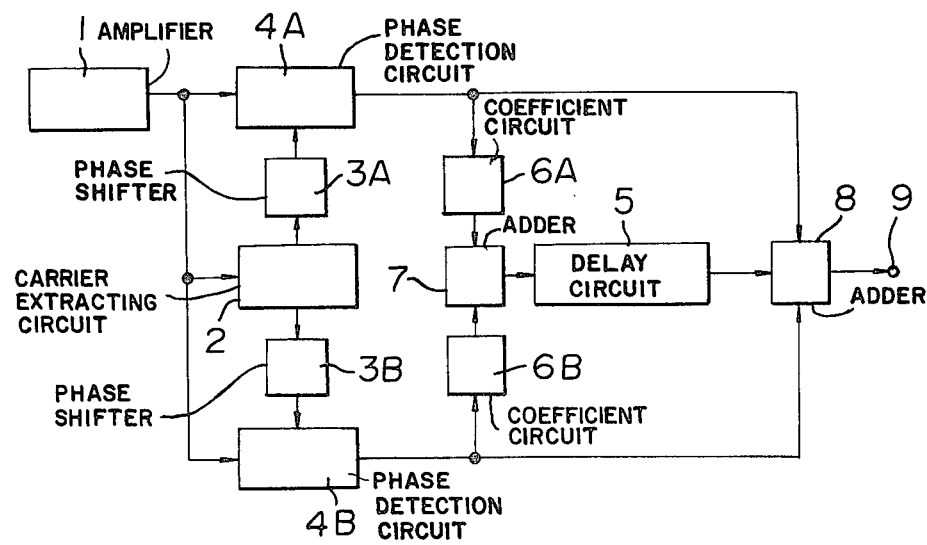
FIG. 1 is a block diagram of a first embodiment of a ghost cancellation apparatus according to the present invention.
Figure 2:
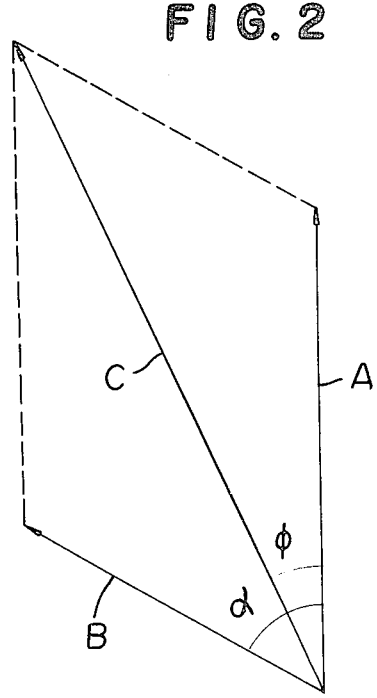

Referring to the FIGURES in the drawing, the embodiments of the present invention will be illustrated.

FIG. 1 illustrates one embodiment of the present invention and shows only a video detection circuit in the TV receiver as the important feature of the present invention.

In FIG. 1, the reference numeral (1) designates an amplifier for a video-intermediate-frequency (hereinafter referred to as VIF) which has the conventional characteristics; (2) designates a carrier extracting circuit having the structure of a narrow band selective amplifier which generates the carrier having the reference phase. The output signal of the VIF amplifier (1) is the composite wave of the direct wave and the ghost wave.

When the phase difference between the carrier of the direct wave and the carrier of the composite wave is $\phi$, the output signal of the carrier extracting circuit (2) is given as cos (wt+$\phi$). The reference (3A) designates the first phase shifting circuit which leads the phase of the reference carrier cos (wt+$\phi$) of the carrier extracting circuit (2) for $\beta$ to generate the first detection axis signal having the phase ($\phi$+$\beta$); $h_1$=cos (wt+$\phi$+$\beta$). The reference (3B) designates the second phase shifting circuit which lags the phase of the reference carrier for $\beta$ to generate the second detection axis signal having the phase ($\phi$−$\beta$); $h_2$=cos (wt+$\phi$−$\beta$). The references (4A) and (4B), respectively, represent the first and second phase detection circuits which detect the output signals of the VIF amplifier (1) in the phase detection by using the signals $h_1$ and $h_2$ as the detection axis signal. The reference numeral (5) designates a delay circuit whose delay time is adjusted to be substantially equal to the delay time of the ghost wave; (6A) and (6B), respectively, designate the first and second coefficient circuits; (7) and (8), respectively, designate the first and second adder circuits. The first adder circuit (7) has the structure for summing the output of the first coefficient circuit (6A) and the output of the second coefficient circuit (6B). The second adder circuit (8) has the structure for summing the outputs of the first and second phase detection circuits (4A), (4B) and the output of the delay circuit (5). The reference numeral (9) designates an output terminal of the second adder circuit (8), i.e., the output terminal of the ghost cancellation circuit.

The output of the VIF amplifier (1) can be given by the equation $$f(t) = a(t) \cos \omega t - b(t) \sin \omega t + \quad (2)$$
$$Ga (t - \tau) \cos (\omega t + \alpha) - Gb (t - \tau) \sin (\omega t + \alpha)$$

wherein $\omega$ designates the frequency of the carrier in the intermediate frequency band; $\tau$ and G designate a delay time and amplitude ratio of the ghost wave to the direct wave, respectively, and the carrier components;

$$A \cos \omega t + GA \cos (\omega t + \alpha) \quad (1)$$

are eliminated.

The reference $\alpha$ designates the phase angle of the ghost wave to the direct wave and is given by the equation $$\omega_c\tau = -\alpha + 2n\pi (n=0, 1, 2 \ldots)$$

wherein $\omega_c$ designates the frequency of the carrier of the broadcast wave.

In the equation (2), the first and second terms, respectively, show the in-phase component and the orthogonal component of the direct wave and the third and fourth terms, respectively, show the in-phase component and the orthogonal component of the ghost wave. The second and fourth terms appear because TV signals are the vestigial side-band signals and a(t) and b(t) are in the orthogonal relation.

When the phase detection of the VIF signal given by the equation (2) is carried out by the first and second phase detection circuits (4A), (4B) having the detection axis signals of $h_1$ and $h_2$, the output signals of the first and second phase detection circuits (4A), (4B) are respectively given by the equations $$u_1 = a \cos(\phi + \beta) + b \sin (\phi + \beta) + \quad (3)$$

-continued
$$Ga_\tau \cos (\phi + \beta - \alpha) + Gb_\tau\sin(\phi + \beta - \alpha)$$

$$u_2 = a \cos(\phi - \beta) + b \sin (\phi - \beta) + Ga_\tau \cos(\phi - \beta - \alpha) + \quad (4)$$
$$Gb_\tau\sin (\phi - \beta - \alpha)$$

wherein a(t) is shown as a and a(t−$\tau$) is shown as $a_\tau$.

The outputs $u_1$, $u_2$ of the first and second phase detection circuits (4A), (4B) shown by the equations (3), (4) are passed through the first and second coefficient circuits (6A), (6B) to compose them in the first adder circuit (7).

The output of the first adder circuit (7) is delayed by the delay circuit (5) and then, it is applied to the second adder circuit (8), which has the structure for summing the outputs $u_1$, $u_2$ and the output of the delay circuit (5). The delay time of the delay circuit (5) is selected to be substantially equal to the delay time of the ghost wave. In the structure, the video signal x at the output terminal (9) of the second adder circuit (8) is given by the equation $$\begin{aligned}x &= u_1 + u_2 + k_1 u_1 \tau + k_2 u_{2\tau} \quad (5)\\ &= a \{\cos (\phi + \beta)\} + \cos (\phi - \beta) + b \{\sin (\phi + \beta) + \\ &\sin (\phi - \beta)\} + a_\tau \{G \cos (\phi + \beta - \alpha) + G \cos (\phi - \beta - \alpha) + \\ &K_1 \cos (\phi + \beta) + k_2 \cos (\phi - \beta)\} + b\tau \{G \sin (\phi + \beta - \alpha) + \\ &G \sin (\phi - \beta - \alpha) + K_1 \sin (\phi + \beta) + k_2 \sin (\phi - \beta)\} + \\ &a_{2\tau} \{k_1 G \cos (\phi + \beta - \alpha) + k_2 G \cos (\phi - \beta - \alpha)\} + \\ &b_{2\tau} \{k_1 G \sin (\phi + \beta - \alpha) + k_2 G \sin (\phi - \beta - \alpha)\}\end{aligned}$$

When the coefficients $k_1$, $k_2$ of the first and second coefficient circuits (6A), (6B) are set to be:

$$k_1 = -G\frac{\sin (2\beta - \alpha) - \sin \alpha}{\sin 2\beta} \quad (6)$$
$$k_2 = -G\frac{\sin (2\beta + \alpha) + \sin \alpha}{\sin 2\beta}$$

the third and fourth terms of the equation (5) are respectively given as zero. At the same condition, both of the fifth and sixth terms of the equation (5) are given as $-2G^2 \cos \beta \sin (\phi-2\alpha)$, whereby the amplitude of the fifth and sixth terms are less than 1/9 even in the case of significant ghost such as G=$\frac{1}{3}$.

That is, the detection phases for the phase detection circuits (4A), (4B) are set to be symmetrical to the carrier phase of the composite wave, and the coefficients $k_1$, $k_2$ of the first and second coefficient circuits (6A), (6B) are selected as shown in the equation (6). The output signal of the adder (8) becomes $$x = a \{\cos (\phi + \beta) + \cos (\phi - \beta)\} + \quad (7)$$
$$b \{\sin (\phi + \beta) + \sin (\phi - \beta)\}$$

which does not include the ghost component. Thus, the ghost is cancelled.

Referring to FIG. 3, the second embodiment of the present invention will be illustrated.

FIG. 3 shows the embodiment having the structure for cancelling a plurality of ghost waves.

In FIG. 3, the reference numeral (5) designates a delay circuit having an intermediate input, wherein the delay time $\tau$i for the i-th input tap to the output terminal is set to be equal to the delay time for the i-th ghost wave. The reference numerals (6A-1), (6B-1), (6A-2), (6B-2) . . . (6B-n) respectively represent the coefficient circuits corresponding to the each ghost wave and (7-1), (7-2) . . . (7-n) respectively, represent the adder circuits corresponding to the each ghost wave. The other structures are substantially similar to those of FIG. 1.

As illustrated in the embodiment of FIG. 1, the detection phases of the first and second phase detection circuits (4A), (4B) can be set regardless of the phase of the ghost wave.

Accordingly, when the coefficients of the i-th coefficient circuits (6A-i), (6B-i), for the i-th ghost wave are set to give the equation $$k_{1i} = -G\frac{\sin(2\beta - \alpha i) - \sin \alpha i}{\sin 2\beta}$$

$$k_{2i} = -G\frac{\sin(2\beta + \alpha i) + \sin \alpha i}{\sin 2\beta}$$

the i-th ghost is cancelled. When the above settings for i=1, 2 ... n are made, all of the ghost can be cancelled.

In the embodiment, the delay circuit having the intermediate input is used. The same effect can be attained by using a plurality of delay circuits having different delay times.

Figure 4:
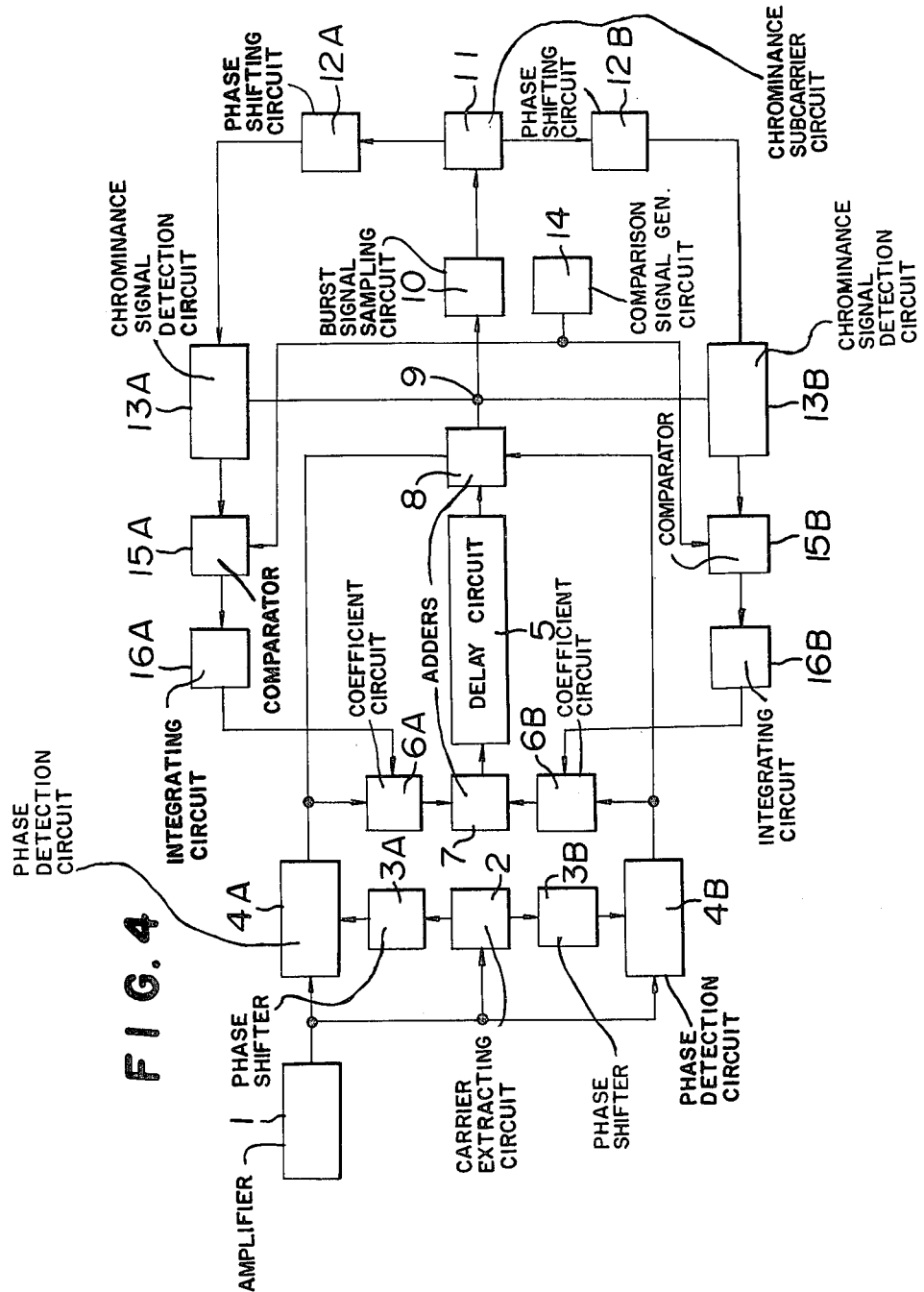

FIG. 4 shows a further embodiment of the present invention wherein the ghost wave is automatically cancelled with a simple structure of the circuit, using the signal included in the TV broadcast signals as the reference signal.

In FIG. 4, the references (1), (4A), (4B), (3A), (3B), (2), (6A), (6B), (7), (5), (8) and (9), respectively, designate parts that are identical to previously described parts and the operations of the parts are similar to them. The illustration will not be recited.

The reference (10) designates a burst signal sampling circuit which samples the burst signal of the direct wave among the output signals of the second adder circuit (8); (11) designates a chrominance subcarrier circuit which generates a continuous chrominance subcarrier whose phase is locked to the phase of the burst signal sampled by the burst signal sampling circuit (10); (12A) designates the third phase shifting circuit which shifts the phase of the output signal of the chrominance subcarrier circuit (11) for $\gamma$; (12B) designates the fourth phase shifting circuit which shifts the phase of the output signal of the chrominance subcarrier circuit (11) for $-\gamma$; (13A) and (13B), respectively, designate chrominance signal detection circuits which carry out the phase detections of the output signal of the second adder circuit (8) by using the output signals of the third and fourth phase shifting circuits (12A), (12B) as the detection axis signals; (14) designates a comparison signal circuit which generates the comparison pulse just after the delay time $\tau$ from the burst signal sampling pulse by the burst signal sampling circuit (10); (15A) and (15B), respectively, designate comparator circuits which discriminate positive or negative of the output signal of the chrominance signal detection circuits (13A), (13B) at the time of the comparison pulse; (16A) and (16B), respectively, designate integrating circuits whose outputs are fed to the coefficient circuits (6A), (6B), respectively.

In the TV broadcast signal, the burst signal is inserted at the rear edge of every horizontal synchronizing pulse. There are certain horizontal scanning lines having only the horizontal synchronizing pulse and the burst signal in the vertical flyback time. So, the detection of ghost signal can be attained without any effect of the direct signal by using the burst signal in the horizontal scanning lines in the vertical flyback time.

The orthogonal component is given as sin pt wherein p designates the frequency of the burst signal, when the in-phase component is given as cos pt, where $\phi$ designates the frequency of the chrominance subcarrier.

Referring to the equation (5), the burst signal among the output signals x of the second adder circuit (8) is given by the equation;

$$\begin{aligned}x_B &= u_1 + u_2 + k_1 u_1 \tau + k_2 u_2 \tau \\ &= \cos(pt - \phi)\cos\beta + \\ &\quad \{G\cos(pt - p\tau - \phi - \beta + \alpha) + \\ &\quad\phantom{\{}G\cos(pt - p\tau - \phi + \beta + \alpha) + \\ &\quad\phantom{\{}k_1\cos(pt - p\tau - \phi - \beta) + \\ &\quad\phantom{\{}k_2\cos(pt - p\tau - \phi + \beta)\}\end{aligned}$$ (10)

In the equation, the first term corresponds to the burst signal of the direct signal, and the second term corresponds to the burst signal of the ghost and the delayed burst signal of the direct signal.

The burst signal sampling circuit (10) samples the first term of the equation (10) among the output signals of the second adder circuit (8). The chrominance subcarrier circuit (11) generates the continuous chrominance subcarrier whose phase is locked to the phase of cos (pt$-\phi$) sampled by the burst signal sampling circuit (10).

The output signal of the chrominance subcarrier circuit (11) is fed to the third and fourth phase shifting circuits (12A), (12B). The third phase shifting circuit (12A) has the structure for leading the phase of the output signal of the chrominance subcarrier circuit (11) for $\gamma$ and the fourth chrominance phase shifting circuit (12B) has the structure for lagging the phase for $\gamma$.

Accordingly, the output signals of the phase shifting circuits (12A), (12B) are respectively shown by the equations $$h_3 = \cos(pt - \phi + \gamma)$$ (11)

$$h_4 = \cos(pt - \phi - \gamma)$$ (12)

The pair of chrominance signal detection circuits (13A), (13B) have the structures for phase detection of the output signal x of the second adder circuit (8) (equation 10), by using the output signals $h_3$, $h_4$ of the third and fourth phase shifting circuits (12A), (12B) as the detection axis signal.

Then, the ghost components $v_1$, $v_2$ of the burst signals in the detection output signals of the chrominance signal detection circuits (13A), (13B) are given by the equations $$\begin{aligned}v_1 &= G\cos(p\tau + \beta - \alpha + \tau) + \\ &\quad G\cos(p\tau - \beta - \alpha + \tau) + \\ &\quad k_1\cos(p\tau + \beta + \tau) + k_2\cos(p\tau - \beta + \tau)\end{aligned}$$ (13)

$$\begin{aligned}v_2 &= G\cos(p\tau + \beta - \alpha - \tau) + \\ &\quad G\cos(p\tau - \beta - \alpha - \tau) + \\ &\quad k_1\cos(p\tau + \beta - \tau) + k_2\cos(p\tau - \beta - \tau)\end{aligned}$$ (14)

From the equations (13), (14), the conditions for $v_1 = v_2 = 0$ are;

$$k_1 = -G\frac{\sin(2\beta - \alpha) - \sin\alpha}{\sin 2\beta}$$ (15)

$$k_2 = -G\frac{\sin(2\beta + \alpha) + \sin\alpha}{\sin 2\beta}$$

The conditions given by the equation (15) are the same conditions given previously by the equation (6), i.e., the conditions of the coefficients of the coefficient circuits (6A) and (6B) for cancelling the ghost.

That is, when the phase detection of the burst signal component in the output signal of the second adder circuit (8) is carried out by the chrominance signal detection circuits (13A), (13B) having the detection axis signals of $h_3$ and $h_4$, the coefficients of the coefficient circuits (6A), (6B) that make the detection output signals $v_1$ and $v_2$ zero simultaneously, are the coefficients required for the cancellation of the ghost.

One embodiment of the control for making $v_1 = v_2 = 0$ is illustrated.

(1) when the output signals $v_1$ (or $v_2$) of the phase detection circuits (13A) (or (13B)) are positive, the coefficient of the coefficient circuit (6A) (or (6B)) is decreased. When the output signals $v_1$ (or $v_2$) are negative, the coefficient of the coefficient circuit is increased. (2) The operation (1) is repeatedly performed. When either of the coefficients (or both of them) reaches to the maximum or minimum value, the direction of increasing and decreasing of the operation (1) is reversed.

The reference numeral (14) designates a comparison signal circuit for generating the timing pulse to the comparator circuits (15A), (15B) after the time $\tau$, delayed from the time for sampling the burst signal by the burst signal sampling circuit (10). The comparator circuits (15A), (15B) discriminate whether the detection output signal of the chrominance signal detection circuits (13A), (13B) are positive or negative at the time of the timing pulse of the comparison signal circuit (14).

The integrating circuits (16A), (16B) receive the positive or negative discrimination signals of the comparator circuits (15A), (15B) to generate the control signals, adding or subtracting the increment to the coefficients, for the coefficient circuits (6A), (6B) and to maintain it for the rest of the field period to the next sampling time.

The coefficient circuits (6A), (6B) are formed, for example, by AGC circuits whose amplification factor can be controlled by the control signals from the integrating circuits (16A), (16B), in proportion to their amplitude. Accordingly, the detection outputs of the chrominance signal detection circuits (13A), (13B) finally become zero by repeating said operations (1), (2) whereby the coefficients of the coefficient circuits (6A), (6B) are set automatically to the desired value shown by the equation (15), i.e., the conditions for ghost cancellation.

The means for detecting the fact that the coefficient becomes the maximum or minimum value as required by the operation (2) depending upon the direction of the coefficient control by the operation (1) and the means for changing the direction of the coefficient control can be easily realized using the circuit component such as comparators and can be incorporated in the integrator circuits (16A), (16B) or can be separately provided.

As described above, the coefficients of the coefficient circuits can be automatically set by a simple circuit structure by using the burst signal in the vertical flyback time, carrying out the phase detection of the burst signal of the ghost with the chrominance subcarrier having the phase of $\gamma$ and $-\gamma$ as the detection axis signals; and discriminating positive or negative of the detection outputs and controlling the coefficient circuits to make the detection outputs zero simultaneously.

For the proper operation, values of $\beta$ and $\gamma$ are to satisfy the relation of, for example, $0 < \beta < \pi/2$ and $\pi/2 < \gamma < \pi$.

The integrating circuits (16A), (16B) can be the analogue integrating circuits or the digital integrating circuits so as to satisfy the functions.

When the digital integrating circuits such as counting circuits are used, there is the advantage of generating a driftless control voltage during the field time for holding the control signals.

When the digital integrating circuit is used, the coefficient circuit can be controlled through the D/A converter or the D/A converter itself can be also used as the coefficient circuit having a digitally controllable gain.

The comparator circuits (15A), (15B) and the integrator circuits (16A), (16B) can be respectively substituted with the sampling hold circuits and the amplifier.

Figure 5:
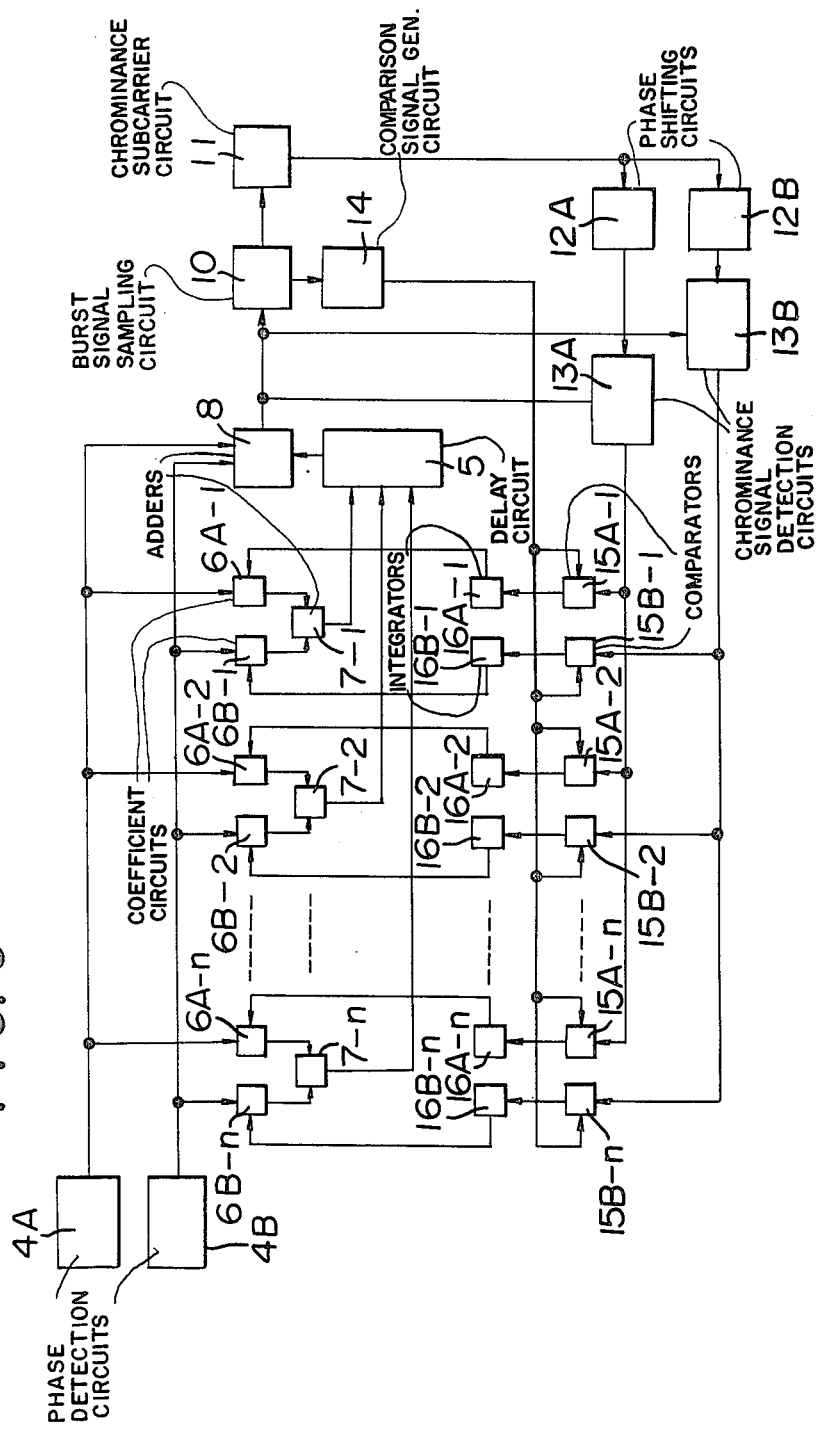

Referring to FIG. 5, another embodiment of the present invention will be illustrated.

FIG. 5 shows the embodiment for automatic setting of the coefficients of the plural pairs of coefficient circuits in the plural ghost cancellation circuit system which can cancel a plurality of the ghost waves.

In FIG. 5, the reference numeral (5) designates a delay circuit having a plurality of intermediate input taps or a plurality of delay circuits having different delay times. The delay time $\tau i$ for the i-th input tap to the output terminal is set to be substantially equal to the delay time of the i-th host wave.

The references (6A-i), (6B-i), respectively, designate coefficient circuits corresponding to the i-th ghost wave; (7-i) designates an adder circuit corresponding to the i-th ghost wave; (15A-i), (15B-i), respectively, comparator circuits corresponding to the i-th ghost wave; (16A-i), (16B-i), respectively, integrating circuits corresponding to the i-th ghost wave which are respectively connected to the coefficient circuits (6A-i), (6B-i). The reference (14) designates a comparison signal circuit which generates the comparison timing pulse to the comparator circuits (15A-i), (15B-i) corresponding to the i-th ghost wave after the time $\tau i$ from the time for the sampling of the burst signal by the burst sampling circuit (10) wherein the reference $\tau i$ designates the delay time of the i-th ghose wave.

Thus, as shown in the embodiment of FIG. 5, the coefficients $k_{1i}$, $k_{2i}$ of the coefficient circuits (6A-i), (6B-i) can be automatically set to the i-th ghost wave, to give the equations $$k_{1i} = -G_i \frac{\sin(2\beta - \alpha_i) - \sin \alpha_i}{\sin 2\beta}$$
$$k_{2i} = -G_i \frac{\sin(2\beta + \alpha_i) + \sin \alpha_i}{\sin 2\beta}$$

Accordingly, the coefficients of the n pairs of the coefficient circuits (6A-1), (6B-1), (6A-n), (6B-n) corresponding n ghost waves can be automatically set by repeating the operation for the case of $i = 1, 2 \ldots n$.

In said embodiment, as the same with the embodiment of FIG. 4, the integrating circuits (16A-i), (16B-i) can be the analogue integrating circuits or the digital integrating circuits.

The comparator circuits (15A-i), (15B-i) and the integrating circuits (16A-i), (16B-i) can be substituted with the combination of the sample holding circuits and the amplifying circuits.

As described in detail, a single or a plurality of ghost waves can be cancelled by the system of the present invention.

Figure 6:
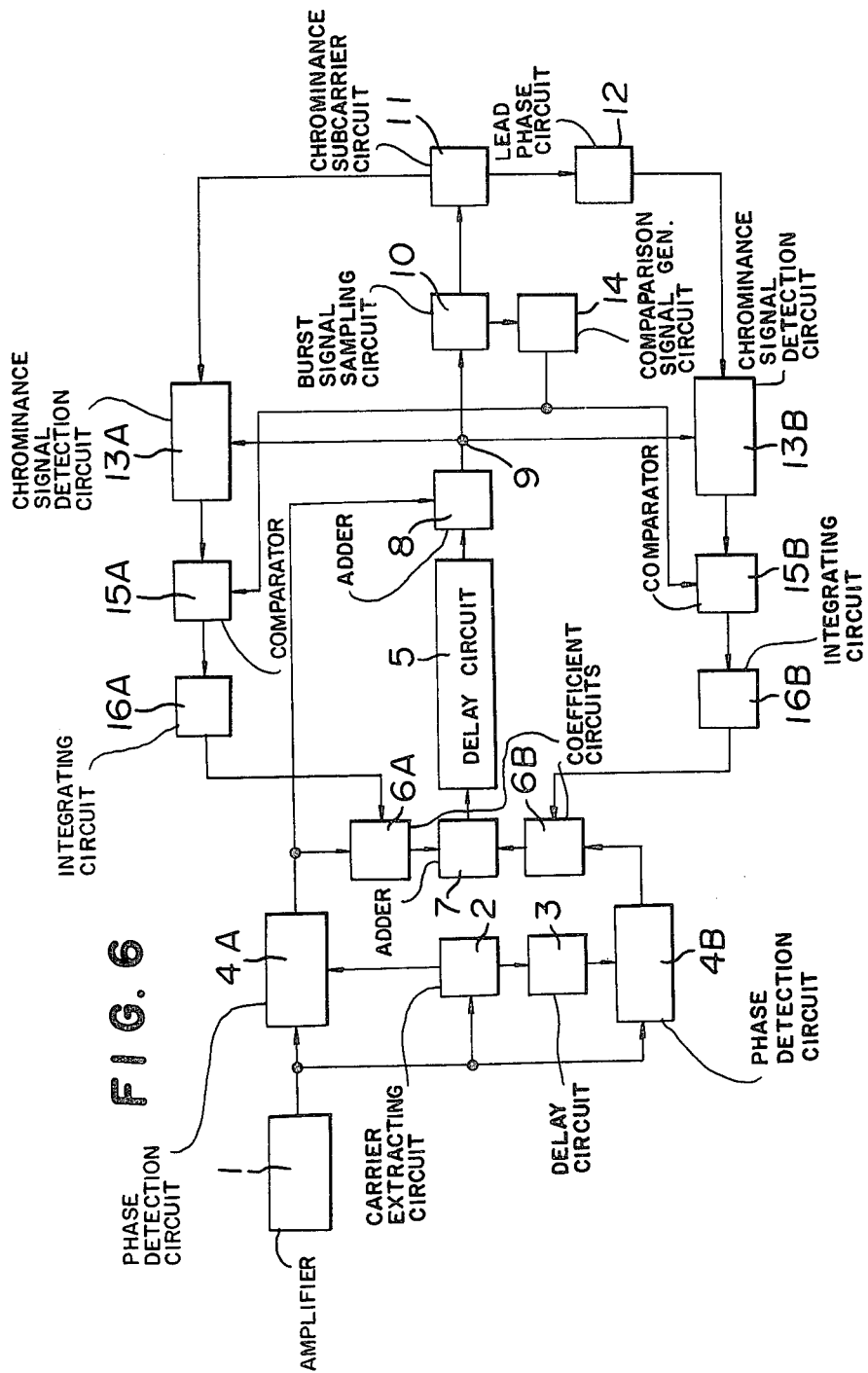

Referring to FIG. 6, another embodiment of the present invention will be illustrated.

In FIG. 6, the reference numeral (3) designates a $\pi/2$ phase shift circuit which lags the carrier signal $\cos(\omega t+\phi)$ of the carrier extracting circuit (2) for $\pi/2$, to generate the detection axis signal $\sin(\omega t+\phi)$.

The first phase detection circuit (4A) performs the phase detection of the output signal of the VIF amplifier (1) by using the output signal $\cos(\omega t+\phi)$ of the carrier extracting circuit (2) as the detection axis signal $h_1$ and the second phase detection circuit performs the phase detection of the output signal of the VIP amplifier (1) by using the output signal $\sin(\omega t+\phi)$ of the $\pi/2$ phase shift circuit (3) as the detection axis signal $h_2$.

The reference (6A), (6B), (7), (5) and (8), respectively, designate the identical parts in the embodiment of FIG. 1.

When the phase detection of the intermediate frequency signal f(t) of the equation (2) is performed by the first phase detection circuit (4A) by using the output signal of the carrier extracting circuit (2) as the detection axis signal $h_1$ and the phase detection of the f(t) is performed by the second phase detection circuit (4B) by using the output signal of the $\pi/2$ phase shift circuit as the detection axis signal $h_2$, the outputs $u_1$, $u_2$ of the phase detection circuits (4A), (4B) are respectively given by the equations $$u_1 = a\cos\phi + b\sin\phi + Ga_\tau\cos(\phi-\alpha) + Gb_\tau\sin(\phi-\alpha) \quad (23)$$

$$u_2 = a\sin\phi - b\cos\phi + Ga_\tau\sin(\phi-\alpha) - Gb_\tau\cos(\phi-\alpha) \quad (24)$$

wherein a (t) is shown as a and a $(t-\tau)$ is shown as $a_\tau$.

The outputs $u_1$, $u_2$ of the first and second phase detection circuits (4A), (4B) shown by the equations (23), (24) are respectively passed through the coefficient circuits (6A), (6B) to be summed in the first adder circuit (7) and the summed signal is transmitted to the delay circuit (5) having the delay time which is substantially equal to the delay time of the ghost wave.

The second adder circuit (8) has the structure for summing the $u_1$ and the output of the delay circuit (5). Accordingly, the output signal x of the second adder circuit (8) is given by the equation:

$$\begin{aligned}x &= u_1 + k_1 u_{1\tau} + k_2 u_{2\tau} \\ &= a\cos\phi + b\sin\phi + \\ &\quad a_\tau\{G\cos(\phi-\alpha) + k_1\cos\phi + k_2\sin\phi\} + \\ &\quad b_\tau\{G\sin(\phi-\alpha) + k_1\sin\phi - k_2\cos\phi\} + \\ &\quad a_{2\tau}\{k_1 G\cos(\phi-\alpha) + k_2 G\sin(\phi-\alpha)\} + \\ &\quad b_{2\tau}\{k_1 G\sin(\phi-\alpha) - k_2 G\cos(\phi-\alpha)\}\end{aligned} \quad (25)$$

wherein the references $k_1$ and $k_2$, respectively, designate the coefficients of the coefficient circuits (6A), (6B).

When the coefficients $k_1$, $k_2$ of the coefficient circuits (6A), (6B) are set to the values $$k_1 = -G\cos\alpha \quad (26)$$

$$k_2 = -G\sin\alpha \quad (27)$$

the third and fourth terms of the equation (25) concerned with $a_\tau$ and $b_\tau$ are zero.

The fifth and sixth terms of the equation (25) have the amplitude ratio of about $G^2$. It is considered that G is usually less than ⅓, whereby the fifth and sixth terms are quite small and can be neglected.

The second term represents the orthogonal component of the direct signal, and is usually negligible because the amplitude of the second term is always less than about ⅓ of the first term for any value of $\alpha$.

Accordingly, the in-phase component and the orthogonal component of the ghost can be cancelled and the orthogonal component of the direct signal can be made quite small in comparison with the in-phase component of the direct signal in the video detection system shown in FIG. 6. It has been illustrated how to cancel the ghost by performing the phase detection of the output signal of the VIF amplifier by the pair of the detection axis signals having the detection phases of the carrier phase of the composite wave of the direct wave and the ghost wave and the $\pi/2$ phase and by setting the coefficients $k_1$, $k_2$ of the coefficient circuits to the values shown by the equations (26), (27).

The system for automatic setting of the coefficients $k_1$, $k_2$ of the coefficient circuits to the values shown by the equation (26), (27) will be illustrated.

In FIG. 6, the reference numeral (12) designates a $\pi/2$ phase lead circuit which leads the output signal of the chrominance subcarrier circuit (11) for $\pi/2$; (13A) and (13B), respectively, designate the third and fourth phase detection circuits to perform the phase detection of the burst signal component included in the output signal of the second adder circuit (8) by using the output signal of the chrominance subcarrier circuit (11) and the $\pi/2$ phase lead circuit (12) as the detection axis signal.

The other structures are similar to those of the embodiment of FIG. 4.

In the same manner as in the case of FIG. 4, the ghost components $v_1$, $v_2$ for the burst signal in the detection output signals of the pair of chrominance signal detection circuits (13A), (13B) are given by the equations:

$$v_1 = G\cos(p\tau-\alpha) + k_1\cos p\tau + k_2\sin p\tau \quad (29)$$

$$v_2 = G\sin(p\tau-\alpha) - k_1\sin p\tau + k_2\cos p\tau \quad (30)$$

From the equations (29), (30), the conditions for $v_1 = v_2 = 0$ are;

$$k_1 = -G\cos\alpha \quad (31)$$

$$k_2 = -G\sin\alpha \quad (32)$$

The condition given by the equations (31), (32) corresponds to the condition for the coefficients of the coefficient circuits (6A), (6B) so as to cancel the ghost given by the equations (26), (27).

That is, the coefficients of the coefficients (6A), (6B) can be set to the coefficients required for cancelling the ghost by performing the phase detection of the output signal $x_B$ of the second adder circuit (8) by the chrominance signal detection circuits (13A), (13B) to give zero ghost in the detection output signals at the burst signal position.

In accordance with the control algorithm illustrated previously in relation to the embodiment of FIG. 4, the integrating circuits (16A), (16B) receive the positive-negative discriminating signals of the comparator circuits (15A), (15B) whereby the constant incremental component is added or subtracted to the coefficient control signal in the direction of increasing or decreasing the coefficients $k_1$, $k_2$ of the coefficient circuits (6A), (6B) and the integrating circuits maintain the control signal for the rest of the field period to the next sampling time.

The coefficient circuits (6A), (6B) have the structures for varying the coefficients of the coefficient circuits (6A), (6B) in proportion to the amplitude of the control signals of the integrating circuits (16A), (16B).

Accordingly, the detection output signals $v_1$, $v_2$ of the chrominance signal detection circuits (13A), (13B) become zero by repeating the control operation whereby the coefficients of the coefficient circuits (6A), (6B) are automatically set to the desired values shown by the equations (31), (32). Thus, the ghost is cancelled automatically.

In a practical case, the delay time of the delay circuit is not equal precisely to the delay time of the ghost wave, whereby a residual ghost may exist.

Figure 7:
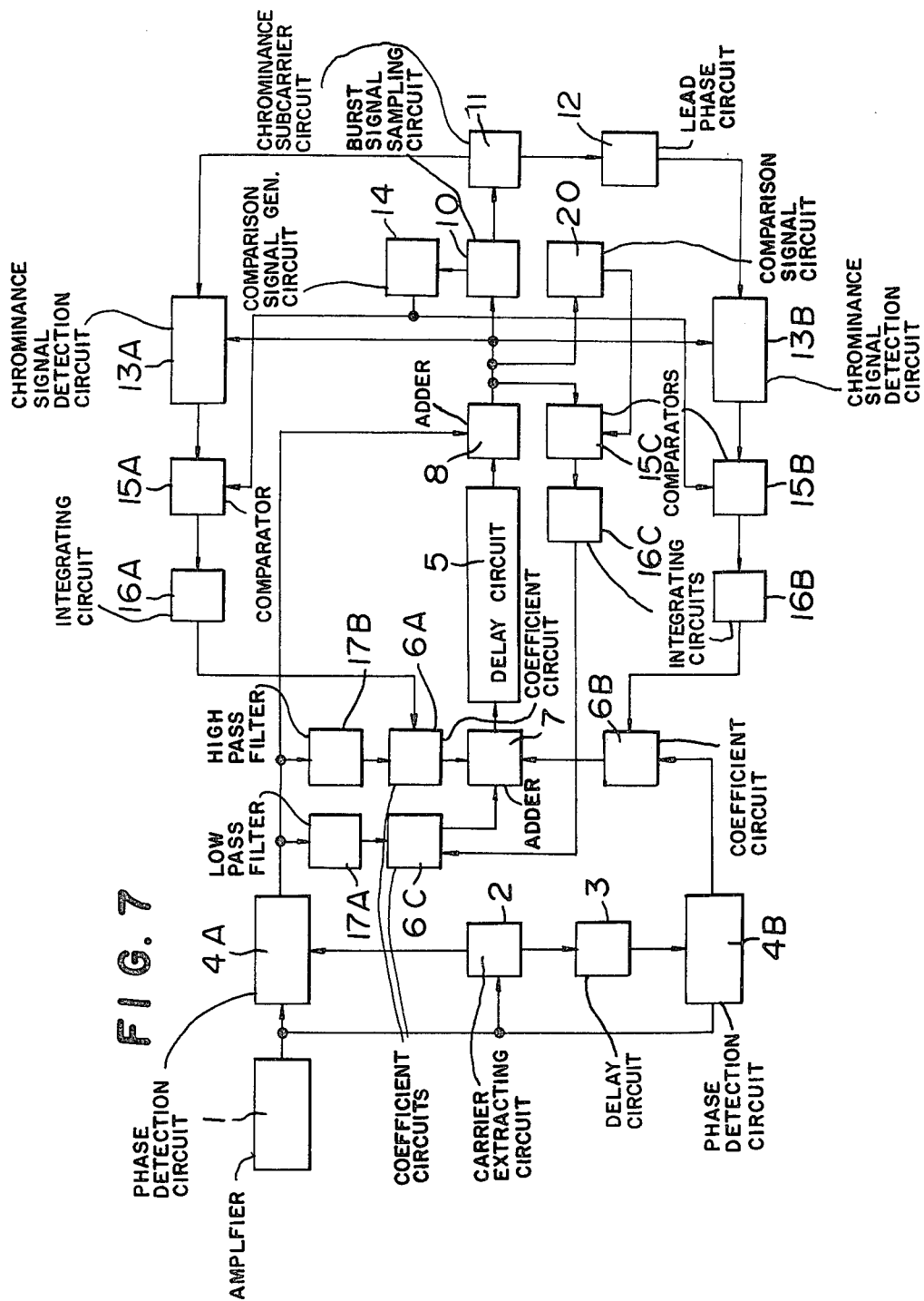

Referring to FIG. 7, there is set forth an embodiment for cancelling the ghost even though the delay time of the delay circuit is not equal precisely to the delay time of the ghost.

In the present embodiment for cancelling the ghost by automatic setting of the coefficients, both the low frequency component of the luminance signal and the chrominance signal component of the ghost can be cancelled, even though the delay time of the delay circuit is not equal to the delay time of the ghost whereby the ghost can be sufficiently cancelled.

In FIG. 7, the reference (6C) designates the third coefficient circuit which is similar to the first and second coefficient circuits (6A), (6B); (17A) designates a low pass filter and (17B) designates a high pass filter. The low pass filter (17A) mainly passes the low frequency component of the luminance signal and the high pass filter (17B) mainly passes the chrominance signal component. The time constants of both of the filters are set to be equal.

The reference (15C) designates the third comparator circuit which is similar to the first and second comparator circuits (15A), (15B) and (16C) designates the third integrating circuit which is similar to the integrated circuits (16A), (16B).

The reference (20) designates the second comparison signal circuit which generates the comparison timing pulse at the ghost position of the horizontal synchronizing pulse during the vertical flyback time; and (7) designates the first adder circuit for summing the output signals of the coefficient circuits (6A), (6B), (6C). The other structure is similar to that of the embodiment of FIG. 6.

The following is a discussion of the case wherein the delay time $\tau'$ of the delay circuit deviates for a time $\Delta\tau$ from the delay time $\tau$ of the ghost.

The chrominance signal component included in the output signal of the first phase detection circuit (4A) is blocked by the low pass filter (17A) but passes through the high pass filter (17B). The signal passed through the high pass filter (17B) is transmitted to the coefficient circuit (6A).

The output signal $u_2$ of the second phase detection circuit (4B) is transmitted to the second coefficient circuit (6B).

The output signal of the first coefficient circuit (6A) and the output signal of the second coefficient circuit (6B) are summed in the first adder circuit (7) and the summed signal is transmitted to the delay circuit (5). The second adder circuit (8) has the structure for summing the output $u_1$ of the first phase detection circuit (4A) and the output of the delay circuit (5). Accordingly, the output signal $x_B$ (on the chrominance signal component) of the second adder circuit (8) is given by the equation:

$$x_B = \cos(pt - \phi) + \qquad (35)$$
$$\{G\cos(pt - p\tau - \phi + \alpha) + k_1\cos(pt - p\tau' - \phi) - k_2\sin(pt - p\tau' - \phi)\}$$

In the same manner as in the case of FIG. 6, the ghost components $v_1$, $v_2$ for the burst signal among the detection output signals of chrominance signal detection circuits (13A), (13B) are given by the equations:

$$v_1 = G\cos(p\tau - \alpha) + k_1\cos p\tau' + k_2\sin p\tau' \qquad (36)$$

$$v_2 = G\sin(p\tau - \alpha) - k_1\sin p\tau' + k_2\cos p\tau' \qquad (37)$$

From the equations (36), (37), the coefficients $k_1$ and $k_2$ for $v_1 = 0$ and $v_2 = 0$, are given by the equations:

$$k_1 = -G\cos(p\tau - p\tau' - \alpha) \qquad (38)$$

$$k_2 = G\sin(p\tau - p\tau' - \alpha) \qquad (39)$$

These coefficients are automatically obtained by the control algorithm so as to be zero of the outputs of the chrominance signal detection circuits (13A), (13B), as discussed in connection with FIG. 6.

Thus, the coefficients of the coefficient circuits required for cancelling the chrominance signal component of the ghost can be automatically obtained even though the delay time of the delay circuit is not equal to the delay time of the ghost. The high frequency components in the luminance signal component of the ghost are also cancelled because their frequencies are nearly equal to the chrominance sub-carrier p.

The operation for cancelling the low frequency component, in the luminance signal component, using the horizontal synchronizing pulse as a reference signal, will be illustrated.

The horizontal synchronizing signal included in the output signal $u_1$ of the first phase detection circuit (4A) is passed through the low pass filter (17A) and is blocked by the high pass filter (17B).

Accordingly, the horizontal synchronizing signal component $x_H$, which represents the low frequency component, in the output signal of the second adder circuit (8) is given by the equation:

$$x_H = \cos p_H t \cos\phi + \qquad (40)$$
$$\{G\cos(p_H t - p_H\tau)\cos(\phi - \alpha) + k_3\cos(p_H t - p_H\tau)\cos\phi + k_2\cos(p_H t - p_H\tau)\sin\phi\}$$

wherein $k_3$ designates the coefficient of the third coefficient circuit (6C) and $p_H$ designates the frequency of the signal under consideration, and $p_H\tau \approx p_H\tau'$ is assumed because of small values for both $\tau' - \tau p_H$.

The ghost component w for the horizontal synchronizing signal in the output signals of the second adder circuit (8) is given by the equation:

$$w = \cos(p_H t - p_H\tau)\{G\cos(\phi - \alpha) + k_3\cos\phi + k_2\sin\phi\} \qquad (41)$$

from the equation (40). In the equation, because of the absolute value of $\phi$ is $|\phi| \leq \pi/10$ for the ghost of $G < \frac{1}{3}$ whereby the effect of the coefficient $k_2$ for w is quite small in comparison with the effect of the coefficient $k_3$. Accordingly, it is possible to make $w = 0$ by varying the coefficient $k_3$, of the coefficient circuit (6C). In this condition, the horizontal synchronizing signal of the ghost, representing the low frequency component, is made zero.

The second comparison signal circuit (20) is the circuit for generating the comparison timing pulse at the ghost position of the horizontal synchronizing signal during the vertical flyback time.

The third comparator circuit (15C) discriminates whether positive or negative of the horizontal synchronizing signal of the ghost among the signals of the second adder circuits (8) by the timing pulse of the second comparison signal circuit (20).

The third integrating circuit (16C) receives the positive or negative discriminating signal of the third comparator circuit (15C) to generate the control signal for the third coefficient circuit (6C) by adding or subtracting the constant incremental component to the direction of increasing or decreasing the coefficient $k_3$ of the third coefficient circuit (6C) and to maintain the control signal until the next sampling time.

The third coefficient circuit (6C) has the structure such as AGC circuit for variable coefficient $k_3$ in proportion to the control signal of the third integrating circuit (16C).

Accordingly, it is possible to make w=0 by controlling the coefficient circuit (6C) to decrease the coefficient $k_3$ in the case where w is positive and to increase the coefficient $k_3$ in the case where w is negative. Thus, the horizontal synchronizing signal of the ghost becomes zero.

As described in detail, the ghosts of the horizontal synchronizing signal and the chrominance signal frequency component among the video signals can be automatically cancelled by the embodiment even though the delay time of the ghost is not equal precisely to the delay time of the ghost wave. Accordingly, the ghost of the low frequency component of the luminance signal which is represented by the horizontal synchronizing signal and the ghost of the chrominance signal component can be effectively cancelled.

There exists a case of a composite of ghosts having slightly different delay times. In accordance with the embodiment of FIG. 7 of the present invention, the composite of ghosts can be effectively cancelled.

The bursts for the composite of ghosts are the superposed bursts for the ghosts for the composite and the phase is decided by the composed phase of the bursts for the ghosts. Thus, the phase detection of the signals is performed by the pair of chrominance signal detection circuits (13A), (13B) and the coefficients of the coefficient circuits (6A), (6B) are controlled to simultaneously provide zero of the output signals $v_1$, $v_2$ whereby the chrominance signal component in the composite of ghosts can be sufficiently cancelled.

The low frequency component in the composite of ghosts can also be effectively cancelled because the residual component of the horizontal synchronizing signal as the representative component is made zero.

There is a possibility of keeping the high frequency component of the luminance signal in the case, however, the high frequency component is not visually significant. Accordingly, the automatic cancellation circuit of the embodiment of the present invention is also effective for cancelling the composite of ghosts.

Figure 8:
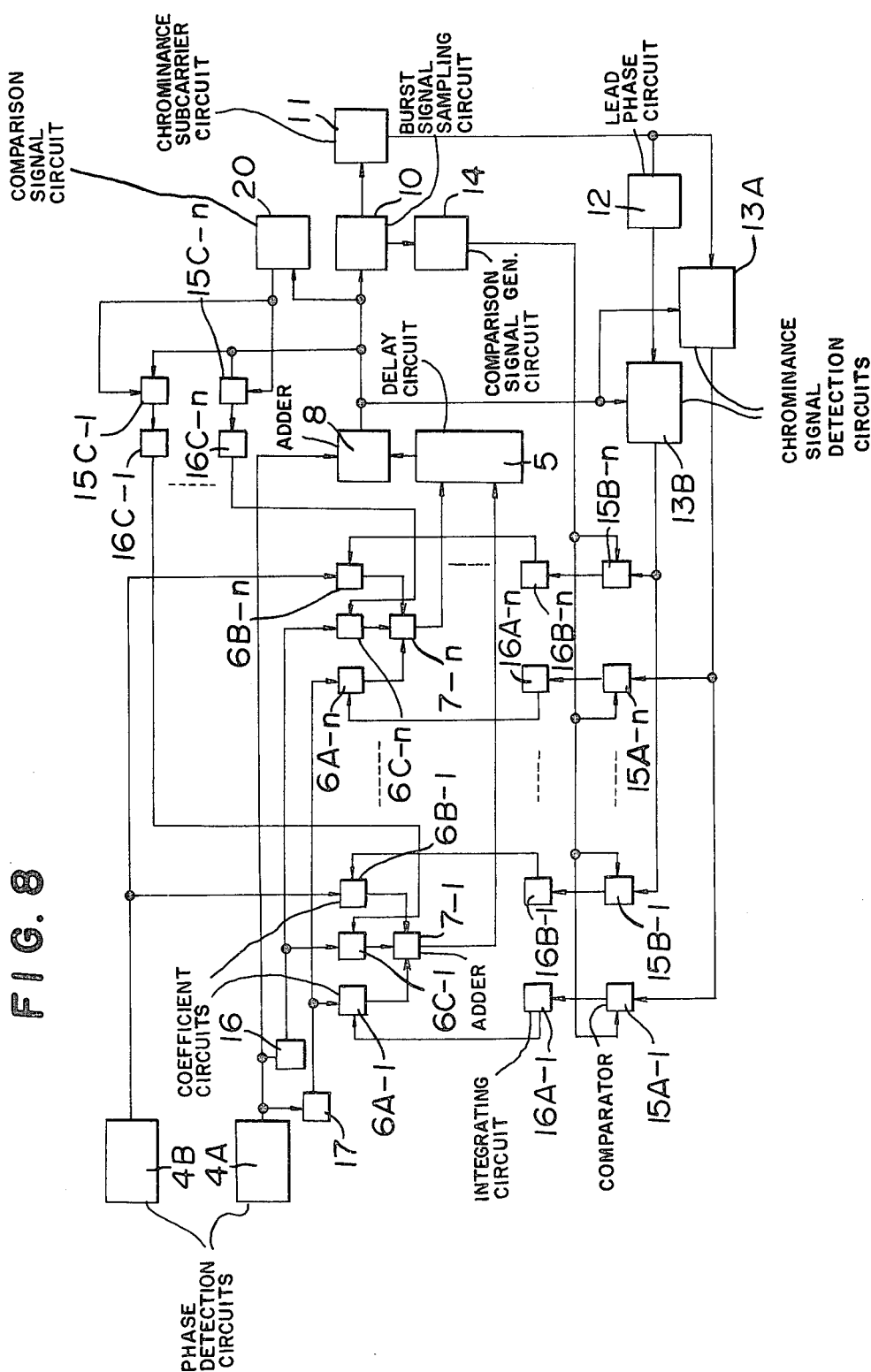

Referring to FIG. 8, another embodiment of the present invention will be illustrated.

FIG. 8 shows the embodiment of the plural ghost cancellation circuit system for cancelling a plurality of ghosts wherein the coefficients in the plural pairs can be automatically set.

In FIG. 8, the reference (5) designates a delay circuit having a plurality of intermediate input taps or a plurality of delay circuits having different delay times; (6A-i), (6B-i), (6C-i) wherein i=1, 2 . . . n), respectively, designate the coefficient circuits corresponding to the i-th ghost; (7-i) designates an adder circuit corresponding to the i-th ghost; (15-i), (15B-i), (15C-i), respectively, comparator circuits corresponding to the i-th ghost; (16A-i), (16B-i), (16C-i), respectively, integrating circuits corresponding to the i-th ghost; (14) and (20), respectively, designate the first and second comparison signal circuits and the first comparison signal circuit (14) generates the comparison timing pulse at the ghost position of the burst signal and the second comparison signal circuit (20) generates the comparison timing pulse at the ghost position of the horizontal synchronizing signal.

It is possible to simultaneously provide zero of the i-th ghost component $w_i$ for the horizontal synchronizing signal component and the outputs $v_{1i}$, $v_{2i}$ of the chrominance signal detection circuits by the structure as described previously.

Thus, the low frequency component and the chrominance signal component for the i-th ghost can be cancelled even though the delay time of the ghost is not equal to the delay time of the delay circuit. Accordingly, the low frequency components and the chrominance signal components for n ghosts can be automatically cancelled by controlling the coefficient for i=1, 2 . . . n.

Another embodiment of the present invention having the function for automatic setting of the delay time of the delay circuit will be illustrated. In this embodiment, the delay time of the delay circuit is set automatically to some specific value relative to the delay time of the ghost whereby the cancellation of the ghost is further improved.

Figure 9:
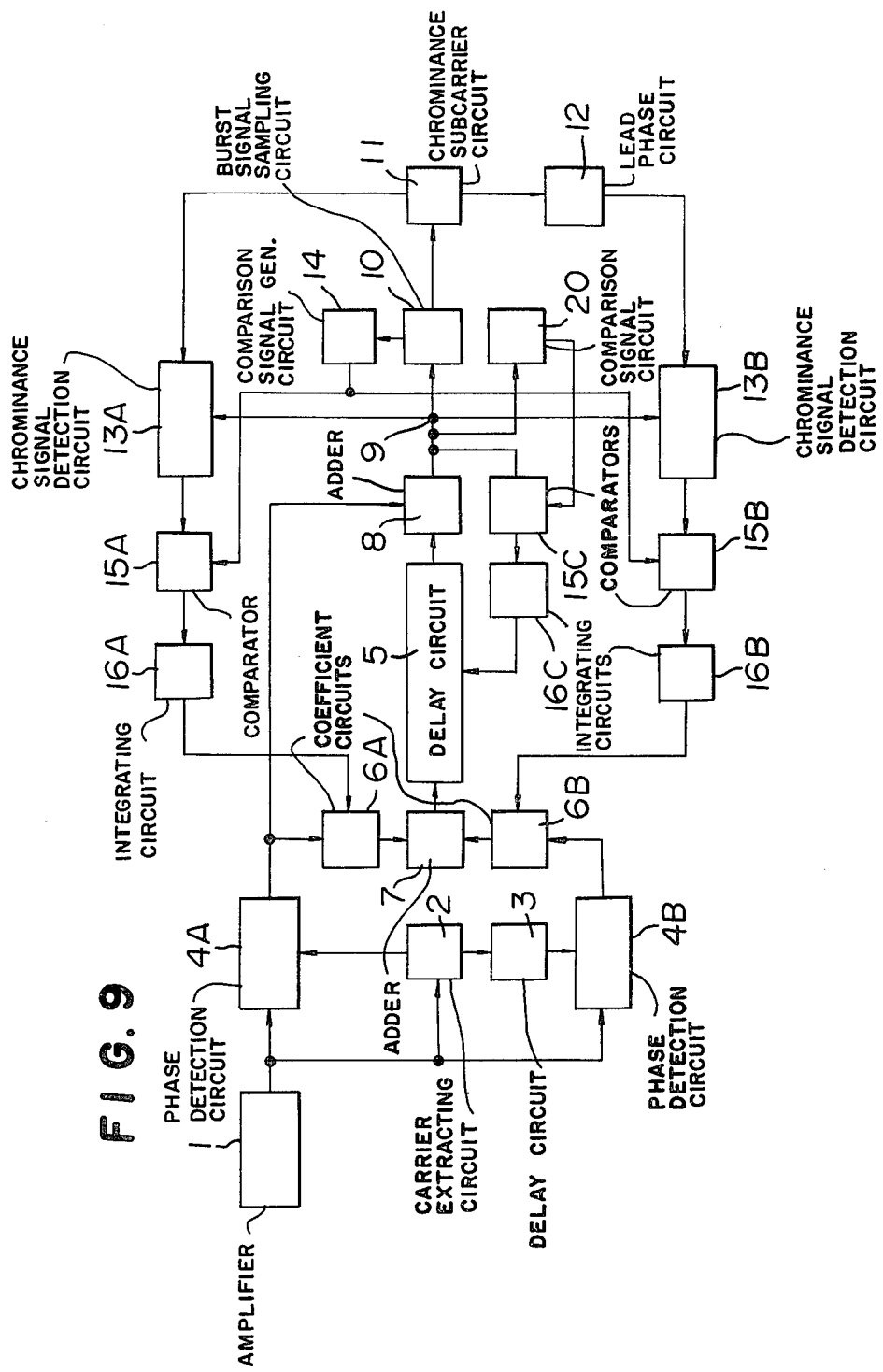

Referring to FIG. 9, this embodiment of the present invention will be illustrated.

In FIG. 9, the reference (16C) designates the third integrating circuit whose output is fed to the delay circuit (5), and the delay circuit (5) has the structure of CCD or the like, whose delay time can be continuously controlled by the signal of the third integrating circuit (16C).

The other structure in this FIGURE is similar to that of the embodiments of FIG. 6 and/or FIG. 7.

In the same manner as in the case of FIG. 7, when the delay time $\tau'$ of the delay circuit is not equal to the delay time $\tau$ of the ghost wave, the burst signal portion of the ghost in the detection output signals $v_1$, $v_2$ of the chrominance signal detection circuits (13A), (13B) are given by the equations:

$$v_1 = G \cos(p\tau - \alpha) + k_1 \cos p\tau' + k_2 \sin p\tau' \qquad (46)$$

$$v_2 = -G \cos(p\tau - \alpha) - k_1 \sin p\tau' + k_2 \cos p\cdot \qquad (47)$$

Also, in the same manner as in the case of FIG. 7, the horizontal synchronizing signal portion of the ghost w, in the output signals of the second adder circuit (8), is given by the equation:

$$w = \cos(p_H t - p_H \tau') \cdot \{G \cos(\phi - \alpha) + k_1 \cos \phi + k_2 \sin \phi\} \qquad (49)$$

As explained previously, the comparator circuits (15A), (15B) discriminate the polarity of the $v_1$ and $v_2$. The integrating circuits (16A), (16B) receive the positive or negative discrimination signals of the comparator circuits to generate the control signals for the coefficient circuits (6A), (6B) to control the coefficient $k_1$, $k_2$ for making $v_1$, $v_2$ zero.

Simultaneously, as in the case of FIG. 7, the third comparator circuit (15C) discriminates the polarity of the horizontal synchronizing signal portion of the ghost w, at the timing pulse of the comparison signal circuit (20). The third integrating circuit (16C) receives the positive or negative discrimination signal of the comparator circuit (15C) to generate the control signal for the delay circuit (5) to decrease the delay time of the delay circuit (5) in the case of positive w and to increase the delay time of negative w for making w zero.

Under the combined control algorithms described above, the coefficiennts $k_1$, $k_2$ of the coefficient circuits (6A), (6B) and the delay time $\tau'$ of the delay circuit (5) finally reach to the convergence point having the conditions of satisfying $v_1=0$, $v_2=0$, and $w=0$, simultaneously. The convergence point is either one of the equations;

$$p(\tau - \tau') = 2n\pi, \qquad (53)$$
$$k_1 = -G \cos \alpha,$$
$$k_2 = -G \sin \alpha,$$

or $$p(\tau - \tau') = 2n\pi - 2(\phi - \alpha), \qquad (54)$$
$$k_1 = -G \cos(2\phi - \alpha),$$
$$k_2 = -G \sin(2\phi - \alpha),$$

where n is an integer.

Now, the ghost component of the video signal of the angular frequency p in the output signal x of the second adder circuit (8) is given by the equation:

$$x_p = G \cos(pt - p\tau - \phi + \alpha) + \qquad (55)$$
$$k_1 \cos(pt - p\tau' - \phi) +$$
$$k_2 \sin(pt - p\tau - \phi)$$

Then, at the convergence point of equation (53) or (54), the ghost component of the angular frequency p in the output signal of the second adder circuit (8) becomes respectively:

$$x_p = -2G \sin \frac{pn\pi}{p} \sin\left(pt + \frac{pn\pi}{p} - \phi + \alpha\right), \qquad (59)$$

or $$x_p = -2G \sin \frac{p(n\pi - \phi + \alpha)}{p} \sin\left[pt + \frac{pn\pi}{p} + \left(1 - \frac{p}{p}\right)(\phi - \alpha)\right] \qquad (60)$$

From the equations shown above, it is evident that: when the delay time of the delay circuit (5), in addition to the coefficients of the coefficient circuit (6A), (6B), is controlled for making $v_1$ $v_2$ and w zero simultaneously, it is possible to cancel the ghost components for the low frequency component ($p \approx 0$), the high frequency component including the chrominance signal ($p \cong p$) and plural frequency components (np/p=integer).

Incidentally, when the delay time of the delay circuit is set precisely equal to the delay time of the ghost (n=o in the equations), the ghost for all frequency components in the video signals can be cancelled.

Figure 10:
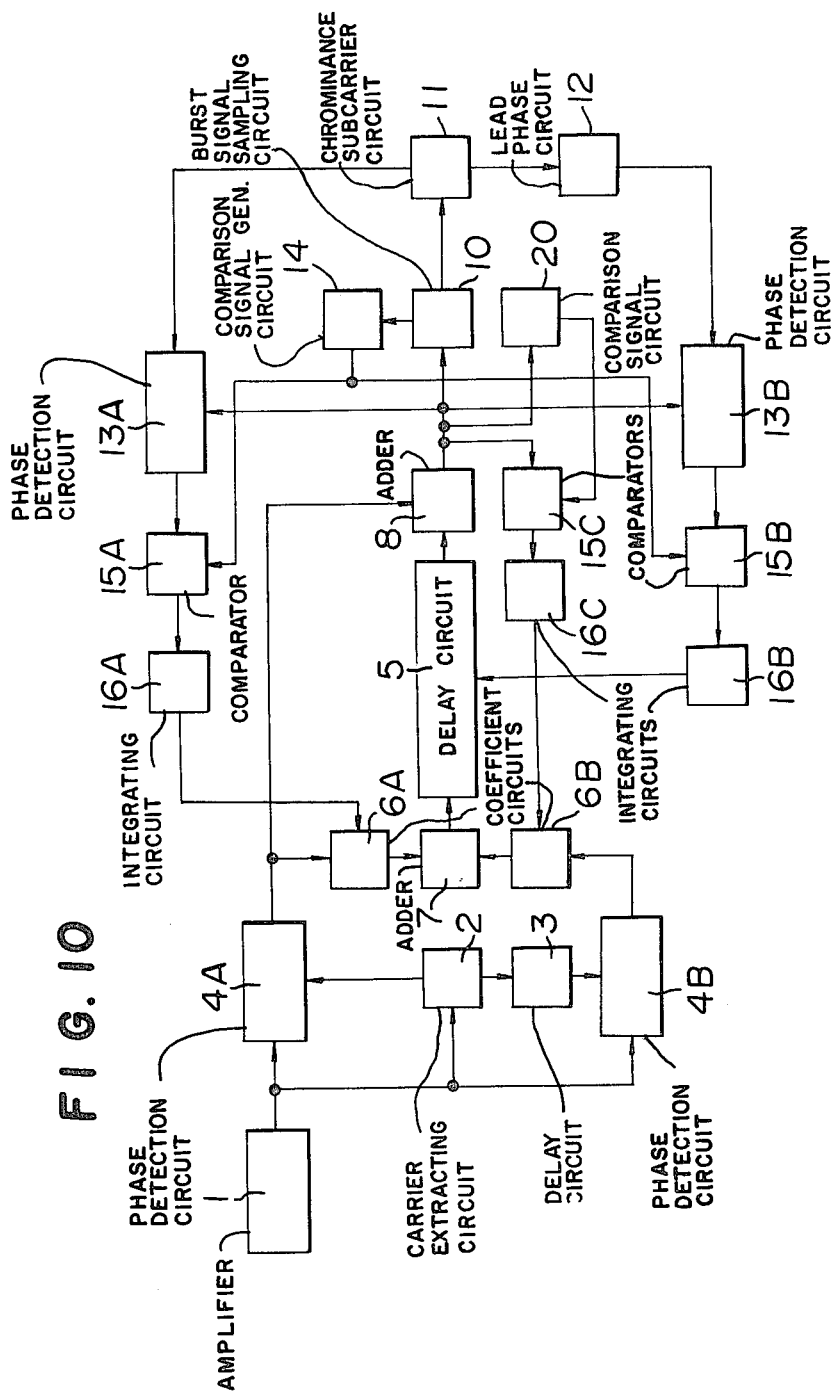
Figure 11:
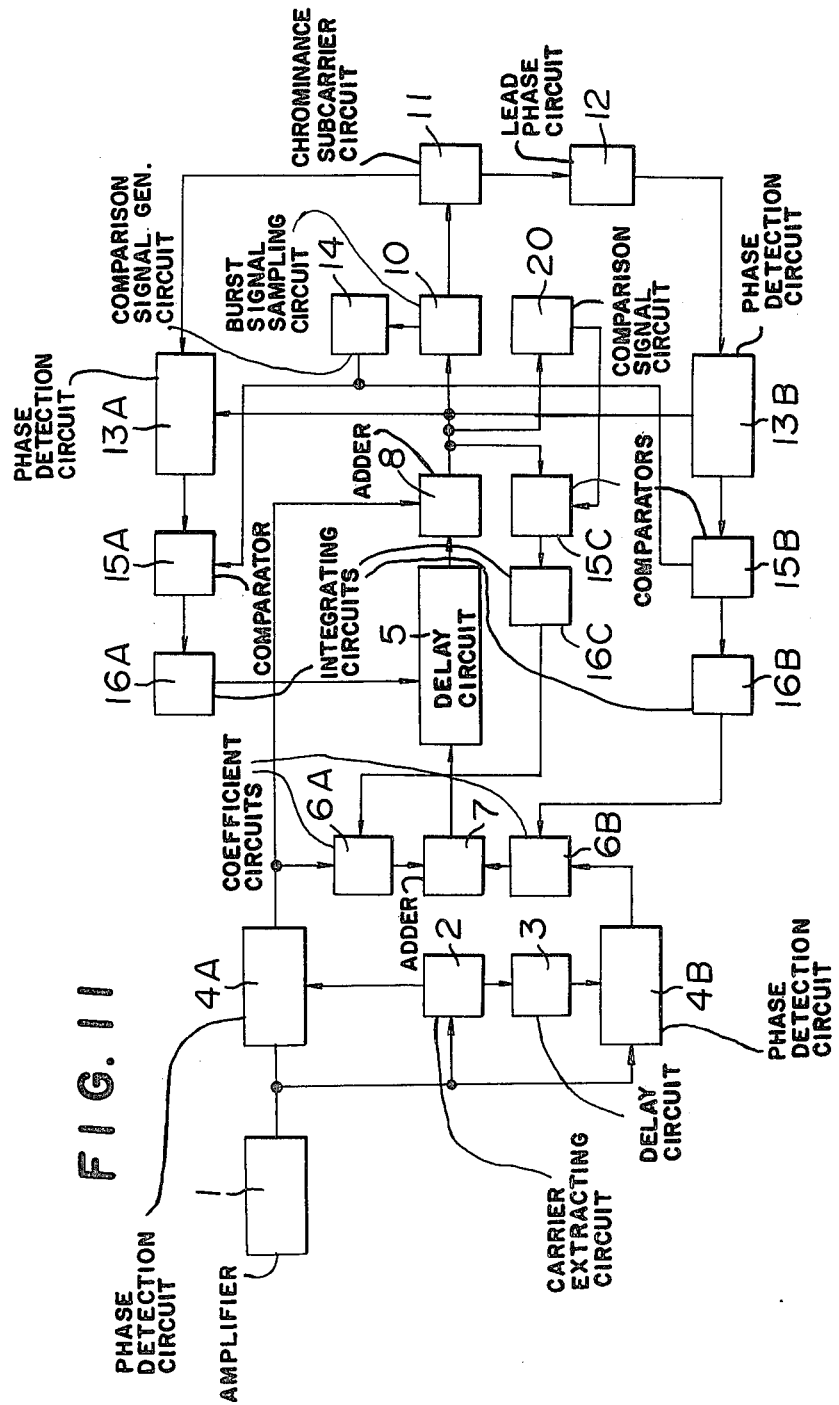

Referring to FIGS. 10 and 11, the other embodiment will be illustrated.

In the embodiment of FIG. 9, the coefficients $k_1$, $k_2$ of the coefficient circuits (6A), (6B) are controlled by the output signals $v_1$, $v_2$ of the chrominance signal detection circuits (13A), (13B) and the delay time is controlled by the ghost component for the horizontal synchronizing signal in the output signals of the second adder circuit (8).

In the embodiment of FIG. 10, the coefficients $k_1$, $k_2$ of the coefficient circuit (6A), (6B) are controlled by the ghost component for the horizontal synchronizing signal and the output signal $v_1$ of one of the chrominance signal detector circuit (13A), and the delay time is set by the output signal $v_2$ of the other chrominance signal detection circuit (13B).

In the other embodiment shown by FIG. 11, the coefficients $k_1$, $k_2$ of the coefficient circuits (6A), (6B) are controlled by the ghost component for the horizontal synchronizing signal and the output signal $v_2$ of one of the chrominance signal detection circuit (13B) and the delay time can be set by the output signal $v_1$ of the other chrominance signal detection circuit (13A).

The control algorithms for the case of FIGS. 10 and 11 are very similar to the case of FIG. 9, and the coefficients $k_1$, $k_2$ of the coefficient circuits and the delay time $\tau'$ of the delay circuit finally reach to the same convergence point given by the equations (53) or (54), and the residual ghost components are given by the equations (59) or (60).

Thus, the ghost components for the low frequency component, the high frequency component including the chrominance signal components and a plurality of frequency components between them in the video signal can be automatically cancelled by providing zero of the ghost component for the horizontal synchronizing signal and zero of the output signal components of the pair of the chrominance signal detection circuits.

Figure 12:
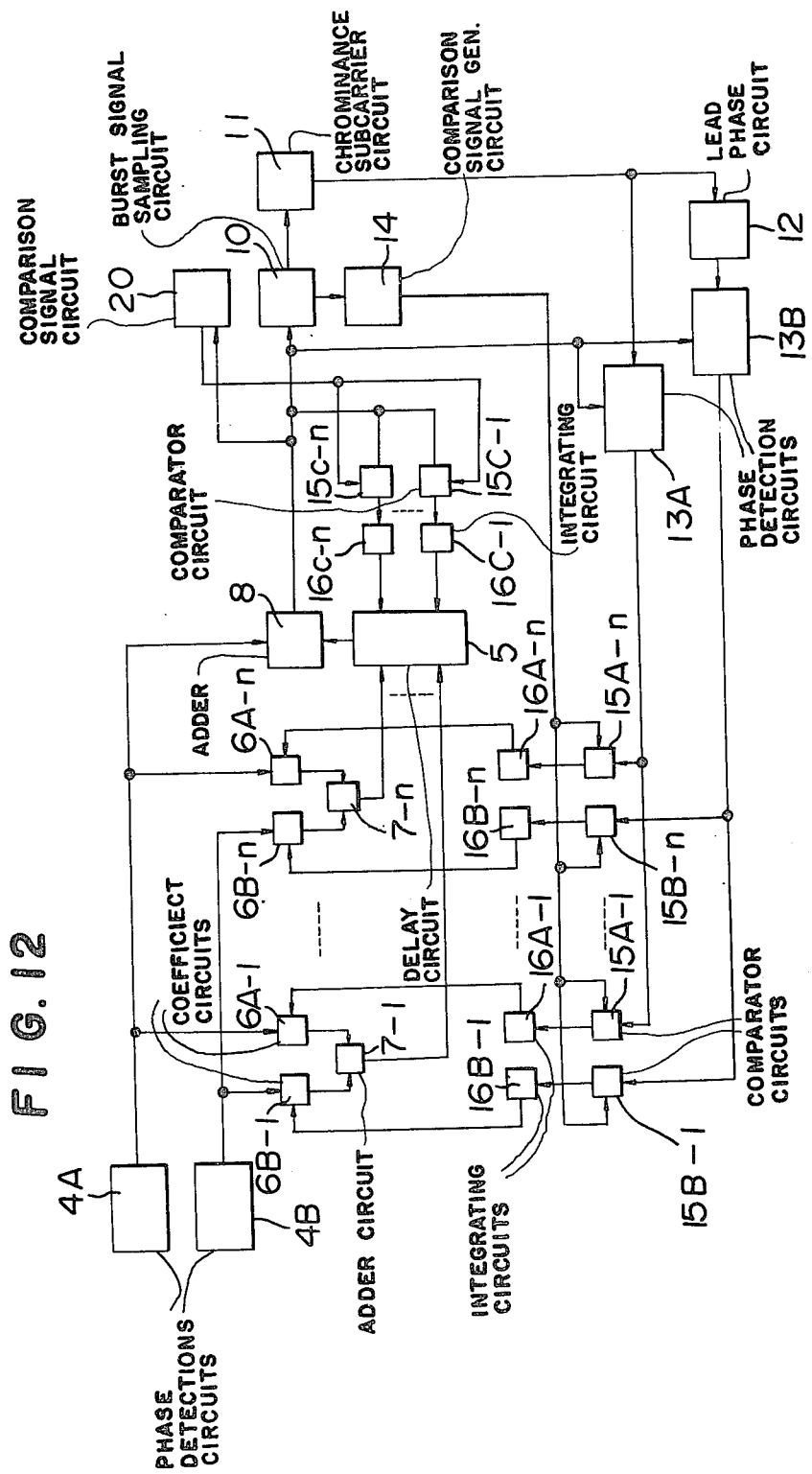

Referring to FIG. 12, another embodiment will be illustrated.

In the embodiment of FIG. 12, of the plural ghost cancellation circuit system for cancelling a plurality of ghost waves, the coefficients of plural pairs of the coefficient circuits and the delay times of the delay circuits are automatically set.

In FIG. 12, the reference numeral (6) designates a plurality of delay circuits; (6A-i), (6B-i) designate the coefficient circuits corresponding to the i-th ghost; (7-i) designates an adder circuit corresponding to the i-th ghost; (15A-i), (15B-i), (15C-i), respectively, designate comparator circuits corresponding to the i-th ghost; (16A-i), (16B-i), (16C-i), respectively, designate integrating circuits corresponding to the i-th ghost.

The other structures are similar to those of the former embodiment.

As described in the embodiment of FIG. 9, the i-th ghost components for the horizontal synchronizing signal $w_i$ and the output signals $v_{1i}$, $v_{2i}$ of the third and fourth phase detection circuits can be simultaneously zero whereby the i-th ghost components for the low frequency component, the chrominance subcarrier component and a plurality of frequency components between them can be cancelled.

When the adjustments are performed in i=1, 2 ... n, the n ghosts for the low frequency components, the chrominance subcarrier frequency components and a plurality of frequency components can be automatically cancelled and the plurality of ghosts are cancelled.

Figure 13:
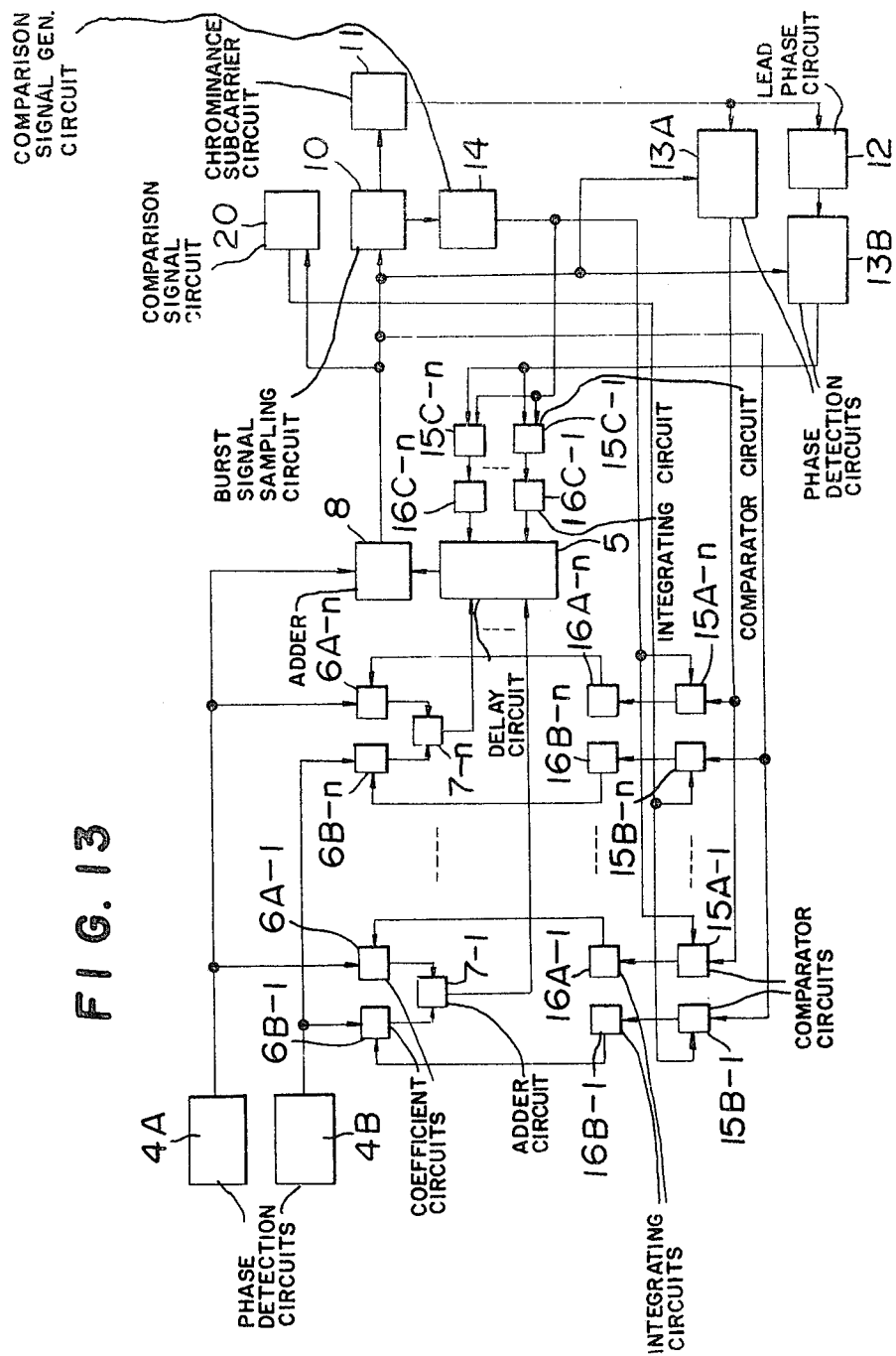
Figure 14:
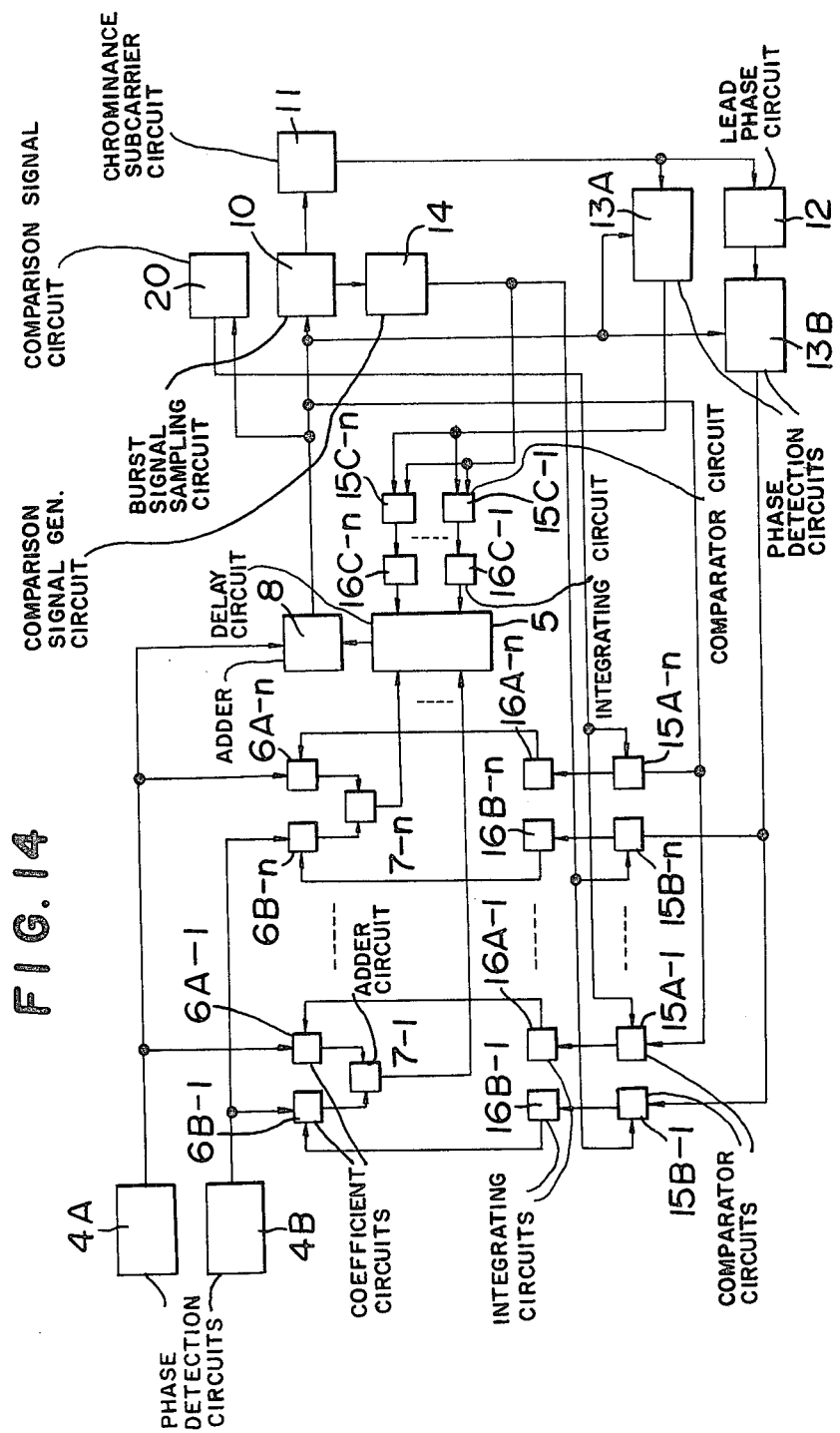

FIG. 13 shows an embodiment which corresponds to the embodiment of FIG. 10 and FIG. 14 shows another embodiment which corresponds to the embodiment of FIG. 11. In the embodiments of FIGS. 13, 14, a plurality of ghosts can be cancelled.

In the embodiments of FIGS. 13, 14, ghost components for the low frequency components, the chrominance subcarrier components and a plurality of frequency components between them can be automatically cancelled and a plurality of the ghosts can be cancelled.

Incidentally, in the embodiments, one of the detection phase of the first and second phase detection circuits for the video detection is adjusted to the phase of the carrier for the composite wave of the direct wave and the ghost wave, and the other is adjusted to the phase of $\pi/2$ lag.

Figure 15:
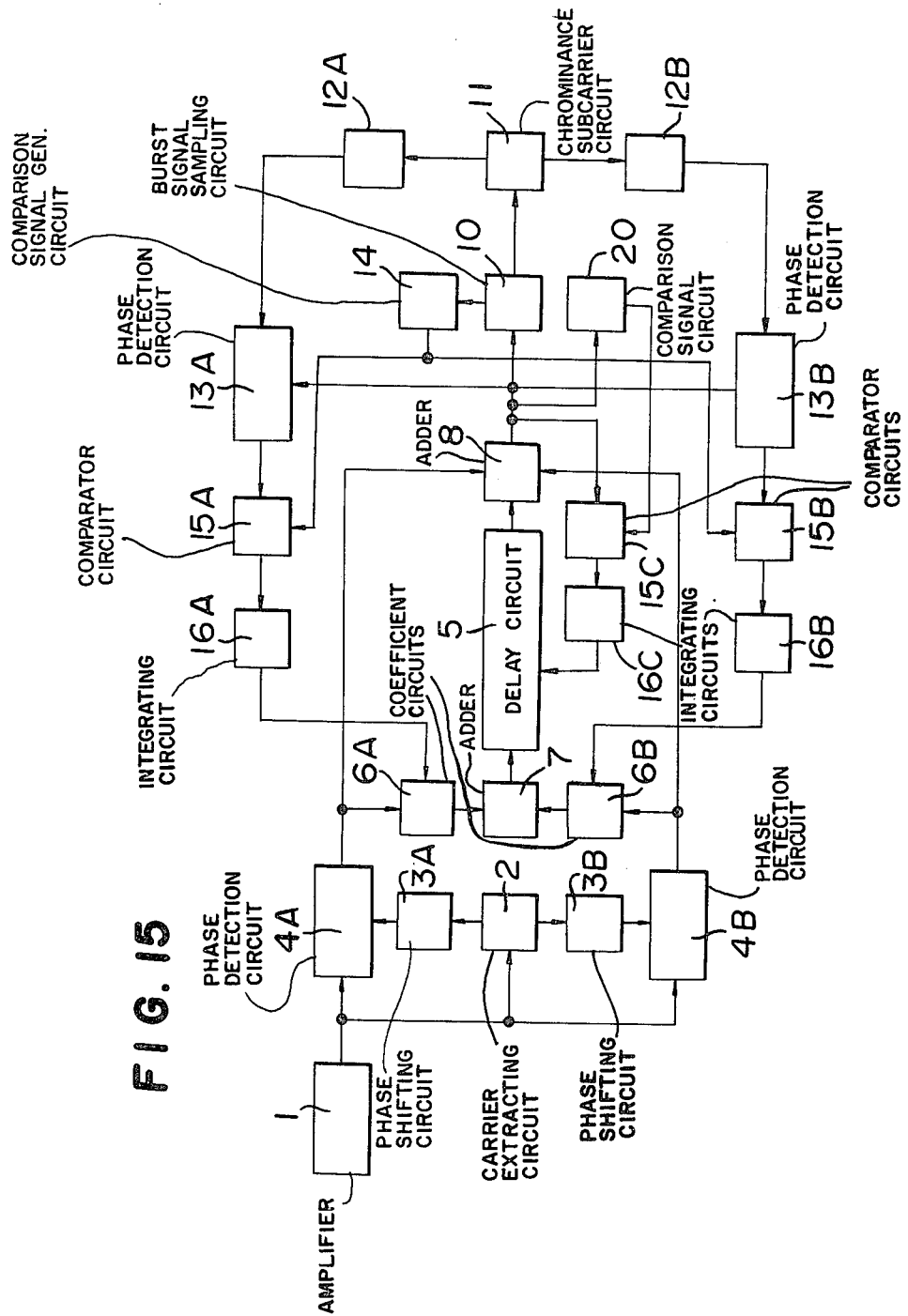

However, even when the detection phases are modified as the embodiment of FIG. 15, the operation can be performed in the same manner.

As shown in FIG. 15, the detection phases of the first and second phase detection circuits (4A), (4B) are shifted for $+\beta$ or $-\beta$ to the phase of the carrier of the composite wave by the phase shifting circuits (3A), (3B) and the output of the second phase detection circuit (4B) is transmitted to the adder circuit (8) and the detection phases of the third and fourth phase detection circuits (the pair of chrominance signal detection circuits) (13A), (13B) are shifted for $+\gamma$ or $-\gamma$ to the burst signal of the direct wave by the phase shifting circuits (12A), (12B).

In said structure, the condition for the cancellation given by either one of the equations below is automatically obtained in a manner similar to the former embodiments.

$$p(\tau - \tau') = 2n\pi \ (n: \text{integer}) \quad (61)$$
$$k_1 = -G\frac{\sin(2\beta - \alpha) - \sin\alpha}{\sin 2\beta}$$
$$k_2 = -G\frac{\sin(2\beta + \alpha) + \sin\alpha}{\sin 2\beta}$$

or $$p(\tau - \tau') = 2n\pi - 2(\phi - \alpha) \ (n: \text{integer}) \quad (62)$$
$$k_1 = -G\frac{\sin(\alpha - 2\phi + 2\beta) + \sin(\alpha - 2\phi)}{\sin 2\beta}$$
$$k_2 = G\frac{\sin(\alpha - 2\phi - 2\beta) + \sin(\alpha - 2\phi)}{\sin 2\beta}$$

Under this condition, the residual ghost component in the output signal of the second adder circuit (8) becomes to be given by one of the equations (59) or (60), and effectively cancelled.

This fact is common to the embodiments of FIGS. 9 to 14.

As described above, in accordance with the system of the embodiments, single or plural ghost can be automatically cancelled.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A ghost cancellation system comprising:
    a carrier extracting circuit for generating a reference carrier having a reference phase out of a composite wave including a direct wave and a ghost wave;
    phase shifting means for generating detection axis signals having a phase independent of the relative phase difference between the reference phase of the reference carrier and the phase of the ghost wave;
    a pair of phase detecting circuits each coupled to the composite wave and a respective detection axis signal for detecting the phase of the composite wave relative to the detection axis signals and for producing output signals based thereon;
    at least two coefficient circuits coupled to the output of respective of said phase detecting circuits for producing respective output signals corresponding to coefficient multiples of the output signals of said phase detecting circuits;
    at least one first adding circuit coupled to the output signals of the at least two coefficient circuits for producing at least one output signal based on the sum thereof;
    delay circuit means coupled to the at least one output signal of said at least one first adding circuit for delaying said at least one output signal thereof a time substantially equal to the delay time of the ghost wave to produce at least one compensation signal based on the delayed at least one output signal of said at least one first adder;
    a second adder circuit for combining the output signal of at least one of the phase detector circuits and the compensation signal of the delay signal means; and
    wherein the coefficients of the coefficient circuits are set in dependence on the phase detection of said phase detecting circuits and the amplitude and phase of the ghost wave, to thereby cancel the in-phase component and the orthogonal component of the ghost wave.

2. A ghost cancellation system as claimed in claim 1, wherein said phase shifting means comprises:
    a pair of phase shifting circuits coupled to the carrier extracting circuit such that the reference carrier is passed through the pair of phase shifting circuits to the pair of phase detection circuits and the output signals of the phase detection circuits are respectively passed through the corresponding coefficient circuits to the delay circuit means and wherein said phase detection axis is set to be symmetric to the phase of the carrier of the composite wave.

3. A ghost cancellation system as claimed in claim 1, further comprising:
    said phase shifting means comprising one phase shifting circuit having a phase shift of $\tau/2$,
    said carrier extracting circuit applying said reference carrier directly and via said phase shifting circuit to said pair of phase detection circuits,
    the outputs of the phase detection circuits respectively passed through the corresponding coefficient circuits to the delay circuit means, and the output of the phase detection circuit, having coupled thereto the carrier reference at the output of the carrier extracting circuit, fed to the adder circuit.

4. A ghost cancellation system as claimed in either one of claims 2 or 3, further comprising:
means for automatically setting the coefficients of the coefficient circuits, which comprises,
a pair of chrominance signal detection circuits,
a chrominance subcarrier circuit which is phase-locked by the burst signal extracted from the output of the adder circuit, wherein a pair of chrominance signal detection axis signals are obtained from output signals of the chrominance subcarrier circuit, and the phase detection of the burst signal of the ghost included in the outputs of the second adder circuit is performed during vertical flyback time by said pair of chrominance signal detection circuits using the chrominance signal detection axis signals to control the coefficients of the corresponding coefficient circuits by the detection outputs, for making the ghost detection output zero.

5. A ghost cancellation system as claimed in claim 4, further comprising:
means for separating the output signal at a selected of said phase detector circuits into a low-frequency component and a high-frequency component;
a pair of chrominance signal detection circuits connected to the compensated output of said chrominance subcarrier circuit for detecting during vertical flyback time and based on burst signal the in-phase component and the orthogonal component of the ghosts having a frequency near the chrominance subcarrier wave for the high frequency component;
means for detecting the ghost in low frequency range for the low frequency component by a horizontal synchronizing signal obtained by sampling the compensated output of said chrominance subcarrier circuit during vertical flyback time; and
means for automatically setting the coefficients of the coefficient circuits to null the ghost components to cancel a single or composed ghost even though the delay time of the delay circuit is not equal to the delay time of the ghost.

6. A ghost cancellation system as claimed in claim 4, further comprising:
a pair of chrominance signal detection circuits connected to the compensated output of said chrominance subcarrier circuit for detecting the in-phase component and the orthogonal component of ghosts having a frequency near the chrominance subcarrier for a high frequency component based on burst signal during vertical flyback time;
means for detecting ghosts in a low frequency range for a low frequency component by a horizontal synchronizing signal obtained by sampling the compensated output of said chrominance subcarrier circuit during vertical flyback time; and
means for automatically setting the coefficients of the coefficient circuits and delay time of the delay time to null the ghost components to cancel the ghost.

7. A ghost cancellation system according to claim 4, further comprising:
a plurality of said coefficient circuits and a plurality of said delay circuits provided to automatically cancel a plurality of ghost waves.

8. A ghost cancellation system according to claim 4, further comprising:
a pair of series connected circuits coupled to the outputs of respective chrominance detection circuits, each including a comparator, an analogue integrating circuit, and a variable gain amplification circuit, wherein the output of each chrominance detection circuit is passed to a respective comparator circuit to discriminate a positive or negative detection and to form a respective constant incremental component of coefficient control signal, which is passed to a respective analogue integrating circuit operable to hold the signal for one field time, and
wherein the output of each integrating circuit is passed to a respective circuit including a variable gain amplification circuit to control the coefficient of the coefficient circuits.

9. A ghost cancellation system according to claim 4, further comprising:
a digital integrating circuit operable to hold the digitally increased or decreased coefficient control signal depending upon a positive or negative detection of the chrominance signal detection output during one field time whereby the coefficients of the coefficient circuits are controlled by the signal of the digital integrating circuit.

* * * * *